United States Patent
Tsujino et al.

(10) Patent No.: US 7,835,082 B2
(45) Date of Patent: Nov. 16, 2010

(54) LINE HEAD AND IMAGE FORMING APPARATUS

(75) Inventors: Kiyoshi Tsujino, Matsumoto (JP); Nozomu Inoue, Matsumoto (JP); Yujiro Nomura, Shiojir (JP); Ken Ikuma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 380 days.

(21) Appl. No.: 12/016,860

(22) Filed: Jan. 18, 2008

(65) Prior Publication Data
US 2008/0225399 A1 Sep. 18, 2008

(30) Foreign Application Priority Data

Mar. 16, 2007 (JP) ............................. 2007-069663
Oct. 22, 2007 (JP) ............................. 2007-274322

(51) Int. Cl.
G02B 27/10 (2006.01)

(52) U.S. Cl. ...................................... 359/622; 359/619

(58) Field of Classification Search ................. 359/619, 359/621, 622, 623, 624; 353/32
See application file for complete search history.

(56) References Cited

U.S. PATENT DOCUMENTS

| | | | |
|---|---|---|---|
| 6,707,613 B2 * | 3/2004 | Fujimoto et al. | 359/622 |
| 6,822,799 B2 * | 11/2004 | Kitamura et al. | 359/622 |
| 2004/0100700 A1 * | 5/2004 | Kitamura et al. | 359/622 |

FOREIGN PATENT DOCUMENTS

JP 09-307697 11/1997

* cited by examiner

*Primary Examiner*—Jack Dinh
(74) *Attorney, Agent, or Firm*—DLA Piper LLP (US)

(57) ABSTRACT

A line head includes: a first lens array having a plurality of first lenses each having a convex surface as a light incidence surface; a second lens array that is arranged at a light-emitting surface side of the first lens array so as to be opposite to the first lens array and that has a plurality of second lenses, which are arranged at positions corresponding to the plurality of first lenses and each of which has a convex surface as a light incidence surface; and at least a light-emitting element provided for each of the first lenses at a light incidence side of the first lens array.

15 Claims, 22 Drawing Sheets

LINE HEAD AND IMAGE FORMING APPARATUS

BACKGROUND

1. Technical Field

The present invention relates to a line head and an image forming apparatus having the same.

2. Related Art

An image forming apparatus has been used to form an image on a recording medium (for example, refer to JP-A-9-307697).

An image forming apparatus disclosed in JP-A-9-307697 includes a microlens array, a light-emitting element array that is provided at a light-incident surface side of the microlens array and emits light toward the microlens array, and a photoconductor that is provided at a light-emitting surface side of the microlens array and has a light receiving surface (imaging surface) which receives light from the microlens array. The microlens array is configured to include a plurality of microlenses and supporting members (holding members) that support the microlens. In addition, a light-incidence-side surface and a light-emission-side surface of each of the microlenses are convex surfaces. That is, each of the microlenses is formed as a biconvex lens.

In the image forming apparatus having such a configuration, the microlens array and the light-emitting element array are arranged opposite each other with a gap therebetween, and a space (hereinafter, this space is called an 'inner space') is formed between the microlens array and the light-emitting element array. In the inner space, an airtight state is normally maintained by a casing (fixing member) that fixes the microlens array and the light-emitting element array thereto. Accordingly, it is prevented that dust, dirt, toner particles, and the like (hereinafter, collectively called 'foreign matters'), which contaminate a light-incidence-side surface of the microlens array, enter into the inner space.

In addition, a space (hereinafter, this space is called an 'outer space') is also formed between the microlens array and the photoconductor (light receiving surface). The outer space communicates with the outside (room where the image forming apparatus is used) of the image forming apparatus. For this reason, when outside (indoor) air enters into the image forming apparatus, the air reaches the outer space and foreign matters included in the air adhere to a light-emission-side surface of the microlens array. As described above, the light-emission-side surface of each microlens is a convex surface. Accordingly, there has been a problem that a concave portion (recess) is formed between adjacent convex surfaces and the adhered foreign matters are accumulated in the recess. It is difficult to remove the accumulated foreign matters. Furthermore, in the microlens array to which the foreign matters adhere, light is blocked or scattered due to the foreign matters. Accordingly, there also has been a problem that a clear image is not formed on a photoconductor since the amount of light to be irradiated onto the photoconductor is not sufficient or a portion of the photoconductor to be exposed is not properly exposed due to scattered light or the like.

SUMMARY

An advantage of some aspects of the invention is that it provides a line head and an image forming apparatus capable of obtaining a clear image and of easily and reliably performing cleaning on a light-emission-side surface.

According to an aspect of the invention, a line head includes: a first lens array having a plurality of first lenses each having a convex surface as a light incidence surface; a second lens array that is arranged at a light-emitting surface side of the first lens array so as to be opposite to the first lens array and that has a plurality of second lenses, which are arranged at positions corresponding to the plurality of first lenses and each of which has a convex surface as a light incidence surface; and at least a light-emitting element provided for each of the first lenses at a light incidence side of the first lens array.

Accordingly, since it is possible to suppress adhesion of foreign matters or to easily remove adhered foreign matters by cleaning, a clear image is obtained and a light-emission-side surface of the second lens array can be easily and reliably cleaned.

In the line head according to the aspect of the invention, preferably, a light-emission-side surface of the second lens array is a flat surface.

Accordingly, since it is possible to suppress adhesion of foreign matters or to more easily remove adhered foreign matters by cleaning, a clear image is obtained and the light-emission-side surface of the second lens array can be more easily and reliably cleaned.

In the line head according to the aspect of the invention, preferably, the first lens array and the second lens array are arranged such that a light-emitting surface of the first lens array and a convex surface of the second lens array abut each other.

In this manner, positioning of each convex surface of the second lens array with respect to a convex surface of each of the first lenses of the first lens array is made.

In the line head according to the aspect of the invention, it is preferable to further include a first light shielding member that is provided between the first lens array and the light-emitting element and has a through hole provided at a position corresponding to each of the first lenses.

Thus, crosstalk between light components emitted from the light-emitting elements corresponding to the first lenses adjacent to each other is reliably prevented. As a result, a clear image can be reliably formed.

In the line head according to the aspect of the invention, it is preferable to further include a second light shielding member that is provided between the first lens array and the second lens array and has through holes provided at positions corresponding to each of the first lenses and each of the second lenses.

Thus, crosstalk between light components emitted from the first lenses adjacent to each other is reliably prevented. As a result, a clear image can be more reliably formed.

In the line head according to the aspect of the invention, assuming that a longitudinal direction of the first lens array is a main scanning direction and a width direction of the first lens array is a sub-scanning direction, it is preferable that the first lens array have the plurality of first lenses that are arranged in a plurality of columns in the main scanning direction and in a plurality of rows in the sub-scanning direction. In addition, assuming that a longitudinal direction of the second lens array is a main scanning direction and a width direction of the second lens array is a sub-scanning direction, it is preferable that the second lens array have the plurality of second lenses that are arranged in a plurality of columns in the main scanning direction and in a plurality of rows in the sub-scanning direction.

Accordingly, the arrangement density of lenses can be made relatively high. As a result, a high-resolution image can be formed.

In the line head according to the aspect of the invention, preferably, a plurality of lens pairs, each of which includes each of the first lenses and each of the second lenses arranged at a position corresponding to each of the first lenses, are configured such that focal distances of at least two of the lens pairs belonging to one column are different.

Accordingly, when light is emitted toward each lens pair from light-emitting elements corresponding to the lens pair, the light transmitted through each lens pair reliably connects focal points.

In the line head according to the aspect of the invention, preferably, the two first lenses that belong to one column and are adjacent to each other are arranged so as to deviate from each other in the main scanning direction, and the two second lenses that belong to one column and are adjacent to each other are arranged so as to deviate from each other in the main scanning direction.

Accordingly, it is possible to further increase the arrangement density of lenses. As a result, an image having higher resolution can be formed.

In the line head according to the aspect of the invention, preferably, the light-emitting elements corresponding to the plurality of first lenses belonging to one column emit light at different timing.

Accordingly, a clearer image is obtained.

In the line head according to the aspect of the invention, preferably, the light-emitting element is provided in a plural number for each of the first lenses.

Accordingly, a clearer image is obtained.

In the line head according to the aspect of the invention, preferably, assuming that a longitudinal direction of the first lens array is a main scanning direction and a width direction of the first lens array is a sub-scanning direction, the plurality of light-emitting elements provided for each of the first lenses are arranged in a plurality of columns in the main scanning direction and in a plurality of rows in the sub-scanning direction.

Accordingly, the arrangement density of light-emitting elements can be made relatively high. As a result, a high-resolution image can be formed.

In the line head according to the aspect of the invention, preferably, the plurality of light-emitting elements provided for each of the first lenses are arranged such that two of the plurality of light-emitting elements, which belong to one column and are adjacent to each other, deviate from each other in the main scanning direction.

Accordingly, it is possible to further increase the arrangement density of light-emitting elements. As a result, an image having higher resolution can be formed.

In the line head according to the aspect of the invention, preferably, in the plurality of light-emitting elements provided for each of the first lenses, the light-emitting element belonging to one row and the light-emitting element belonging to another row different from the one row emit light at different timing.

Accordingly, a clearer image is obtained.

In the line head according to the aspect of the invention, preferably, the line head is arranged opposite a light receiving surface of a photoconductor that receives light emitted from the second lens array, and the line head further includes a positioning unit that regulates a distance between the light receiving surface and the second lens array.

In this manner, positioning of a light receiving surface and a lens array is reliably made.

According to another aspect of the invention, an image forming apparatus includes: a photoconductor having a light receiving surface that receives light; and a line head arranged opposite the light receiving surface. The line head includes: a first lens array having a plurality of first lenses each having a convex surface as a light incidence surface; a second lens array that is arranged at a light-emitting surface side of the first lens array so as to be opposite to the first lens array and that has a plurality of second lenses, which are arranged at positions corresponding to the plurality of first lenses and each of which has a convex surface as a light incidence surface; and at least a light-emitting element provided for each of the first lenses at a light incidence side of the first lens array.

Accordingly, since it is possible to suppress adhesion of foreign matters or to easily remove adhered foreign matters by cleaning, a clear image is obtained and a light-emission-side surface of the lens array can be easily and reliably cleaned.

In the image forming apparatus according to the aspect of the invention, it is preferable to further include a cleaning unit that cleans a light-emission-side plane surface of the second lens array.

Accordingly, in the case when cleaning on a light-emission-side surface of a lens array is performed, the operation can be easily and reliably performed.

In the image forming apparatus according to the aspect of the invention, preferably, a light-emission-side surface of the second lens array is a flat surface.

Accordingly, since it is possible to suppress adhesion of foreign matters or to easily remove adhered foreign matters by cleaning, a clear image is obtained and a light-emission-side surface of the lens array can be more easily and reliably cleaned.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a line head and an image forming apparatus according to preferred embodiments of the invention will be described in detail with reference to the accompanying drawings.

Figure 1:
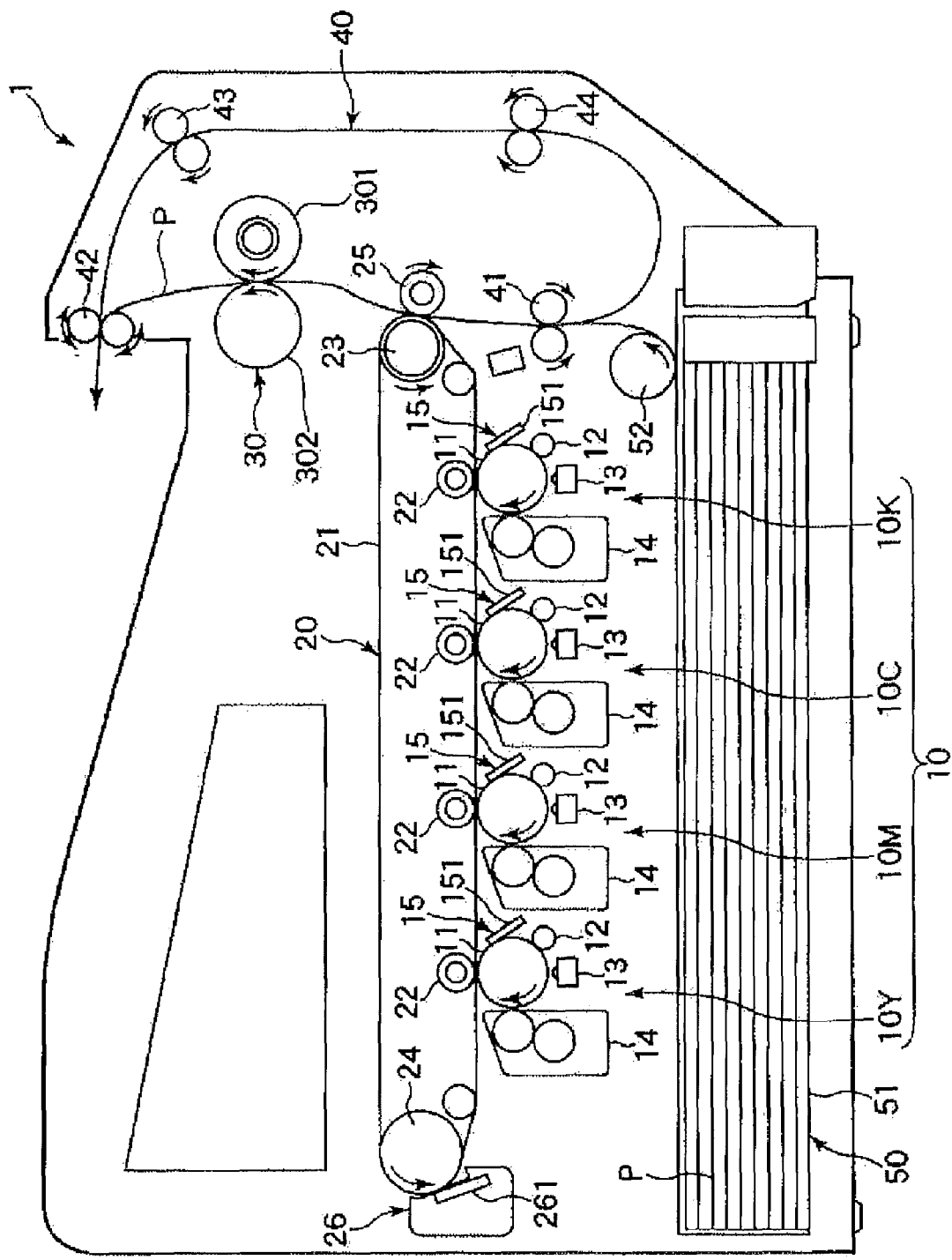
FIG. 1 is a view schematically illustrating the entire configuration of an image forming apparatus according to an embodiment of the invention.
Figure 2:
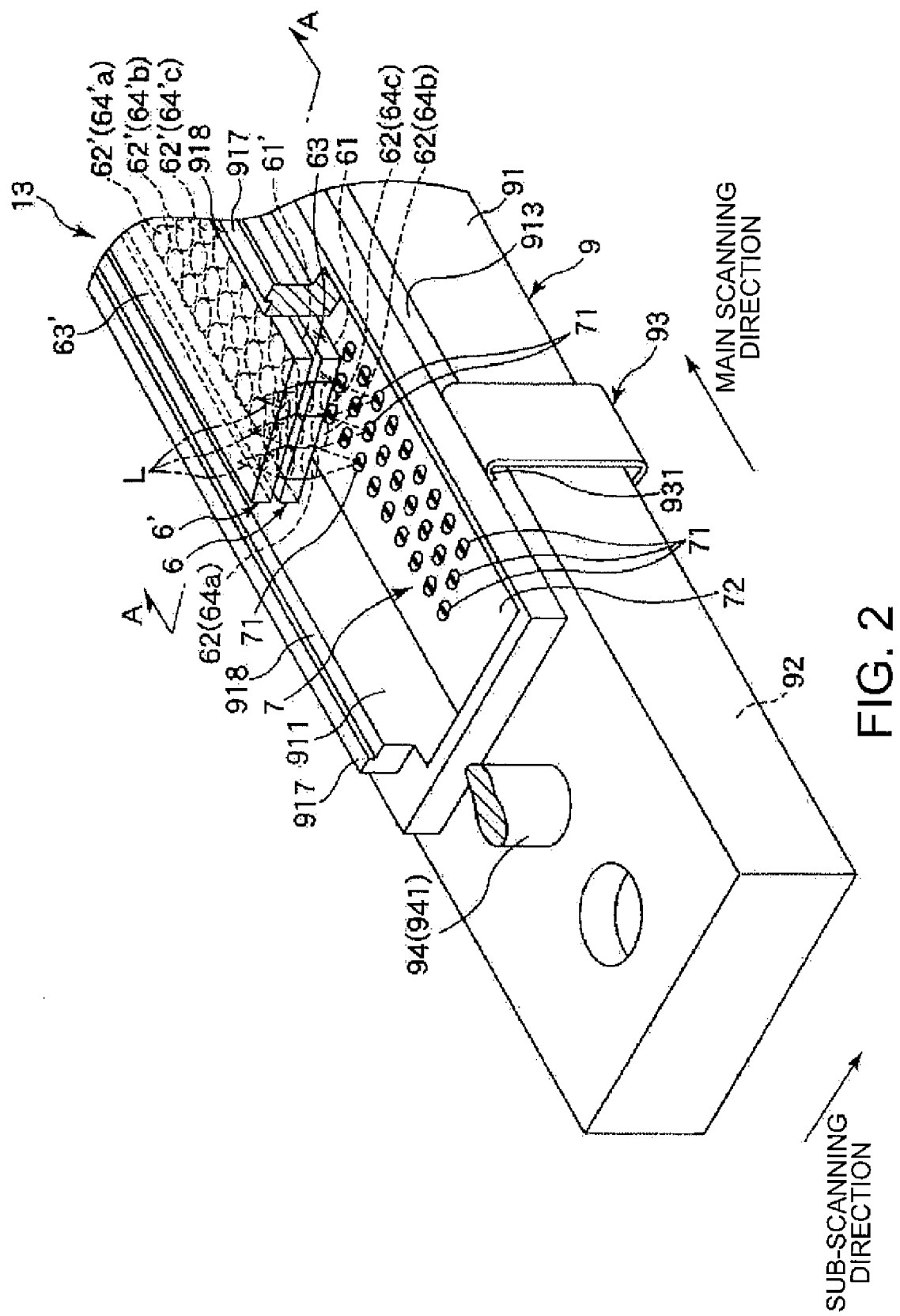
FIG. 2 is a partially sectional perspective view illustrating a first embodiment of a line head included in the image forming apparatus shown in FIG. 1.
Figure 3:
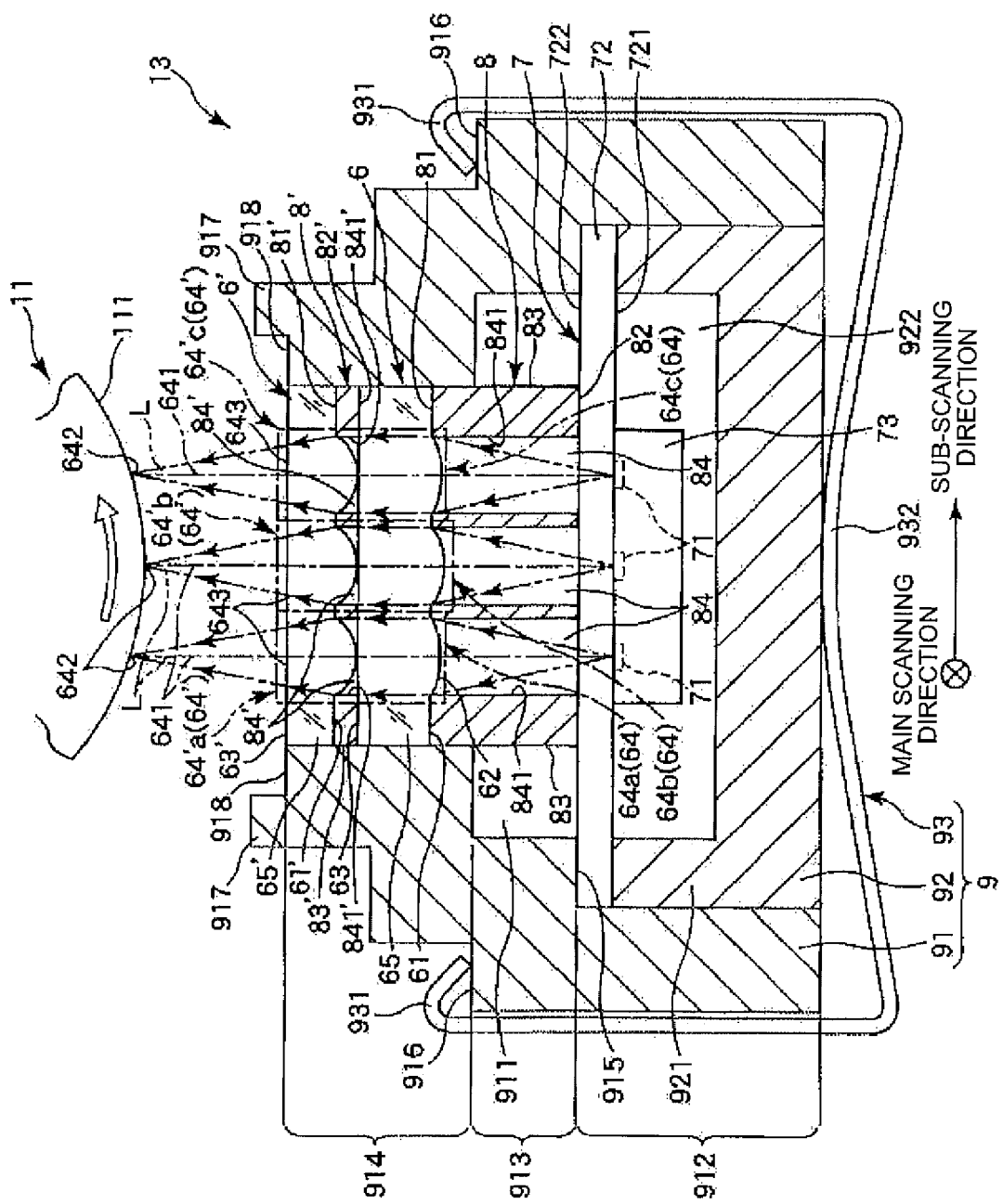
FIG. 3 is a cross-sectional view taken along the line III-III of FIG. 2.
Figure 4:
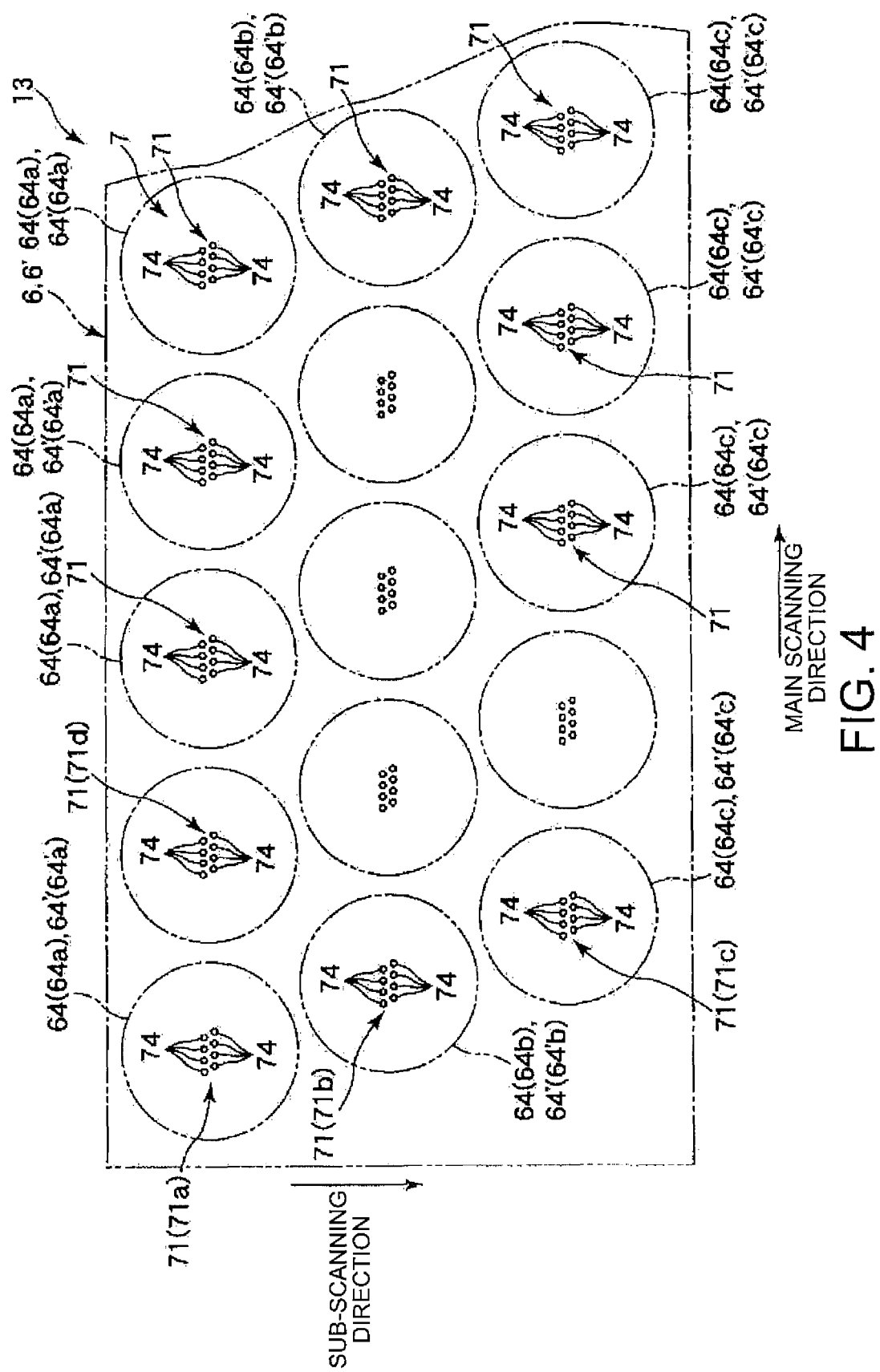
FIG. 4 is a plan view illustrating the line head shown in FIG. 2.
Figure 5:
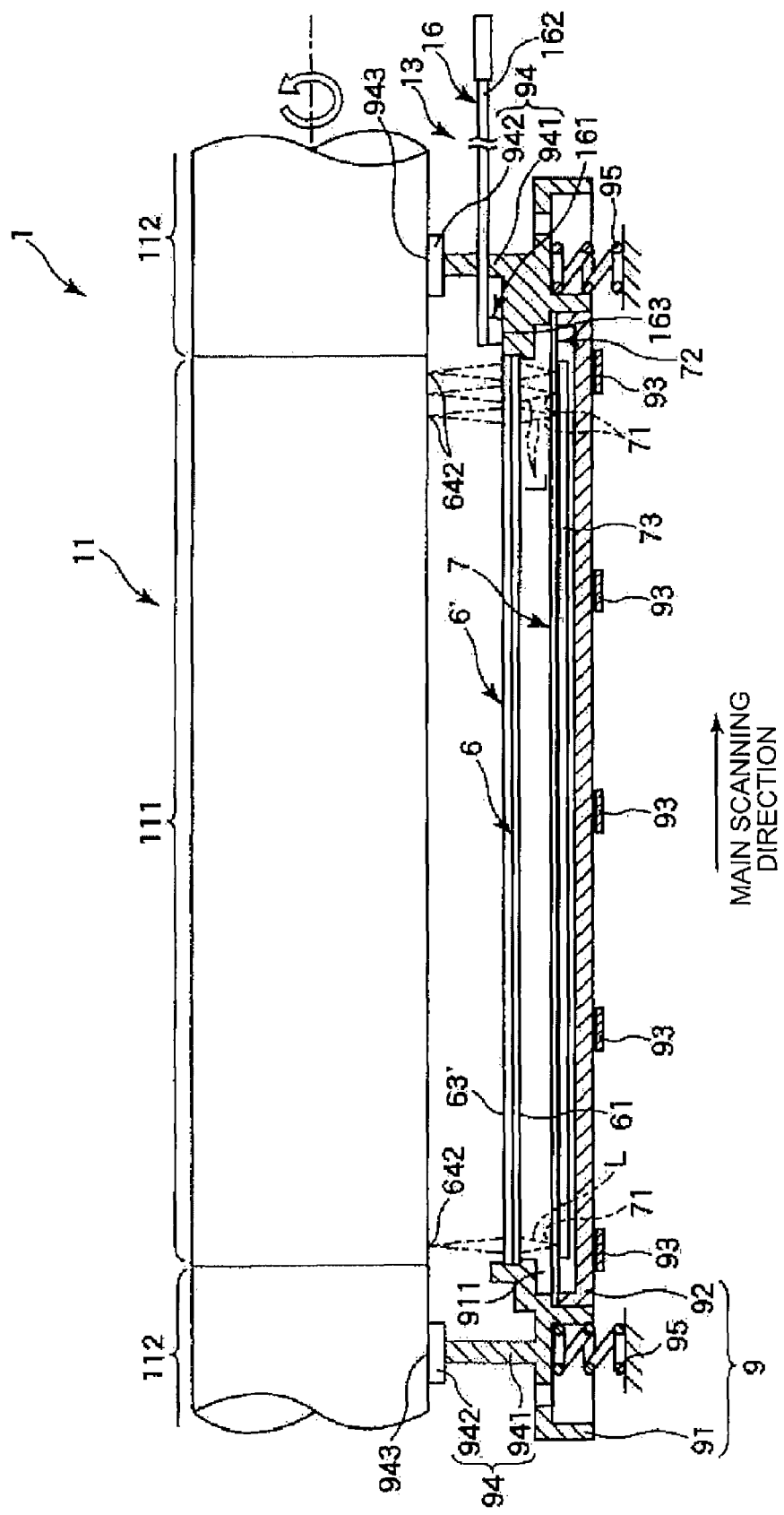
FIG. 5 is a longitudinal sectional view illustrating parts of a line head and a photoconductor of the image forming apparatus shown in FIG. 1 (view illustrating a state where a cleaner is provided).
Figure 6:
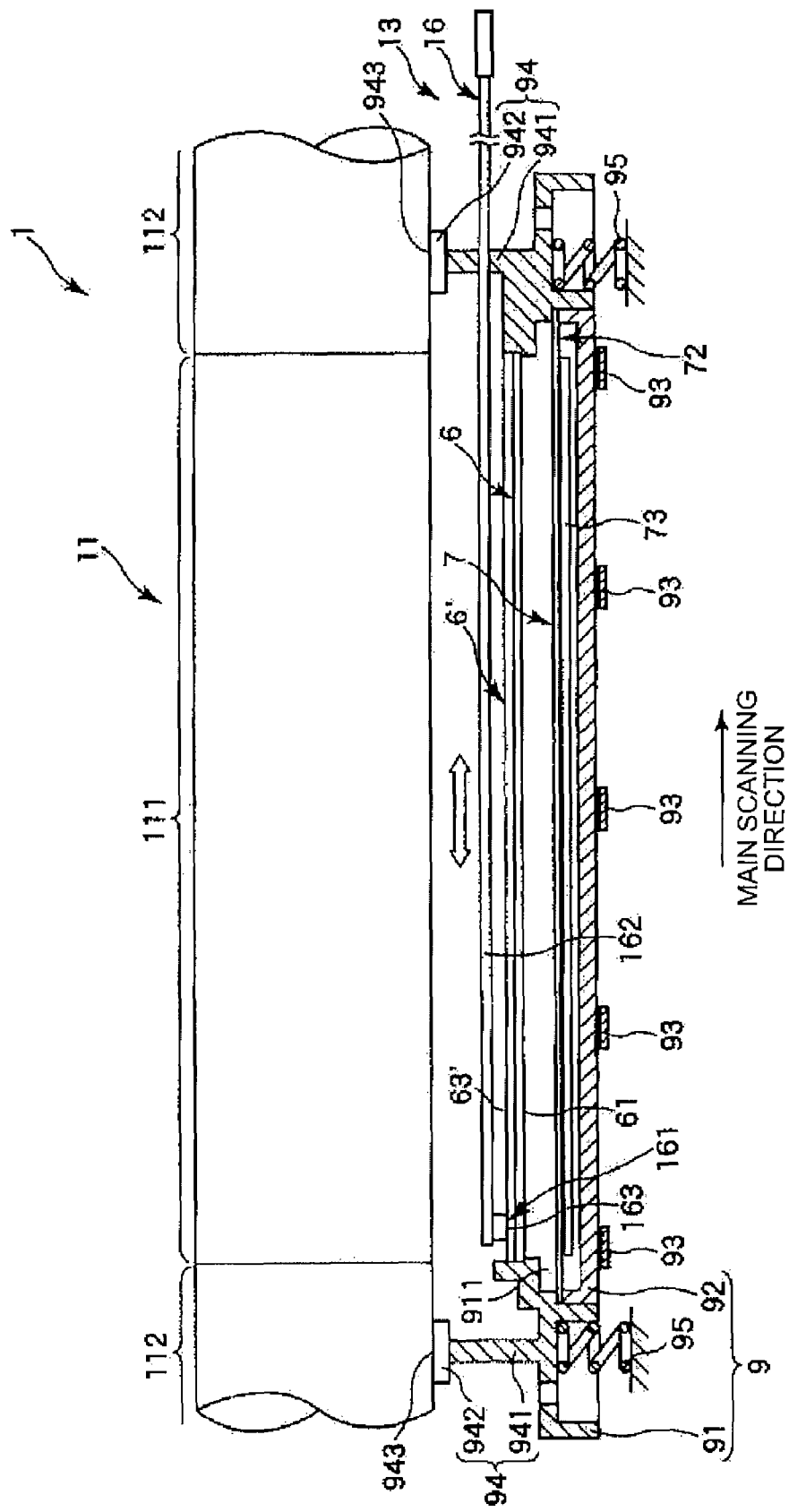
FIG. 6 is a longitudinal sectional view illustrating parts of a line head and a photoconductor of the image forming apparatus shown in FIG. 1 (view illustrating a state where cleaning is performed by using a cleaner).
Figure 7:
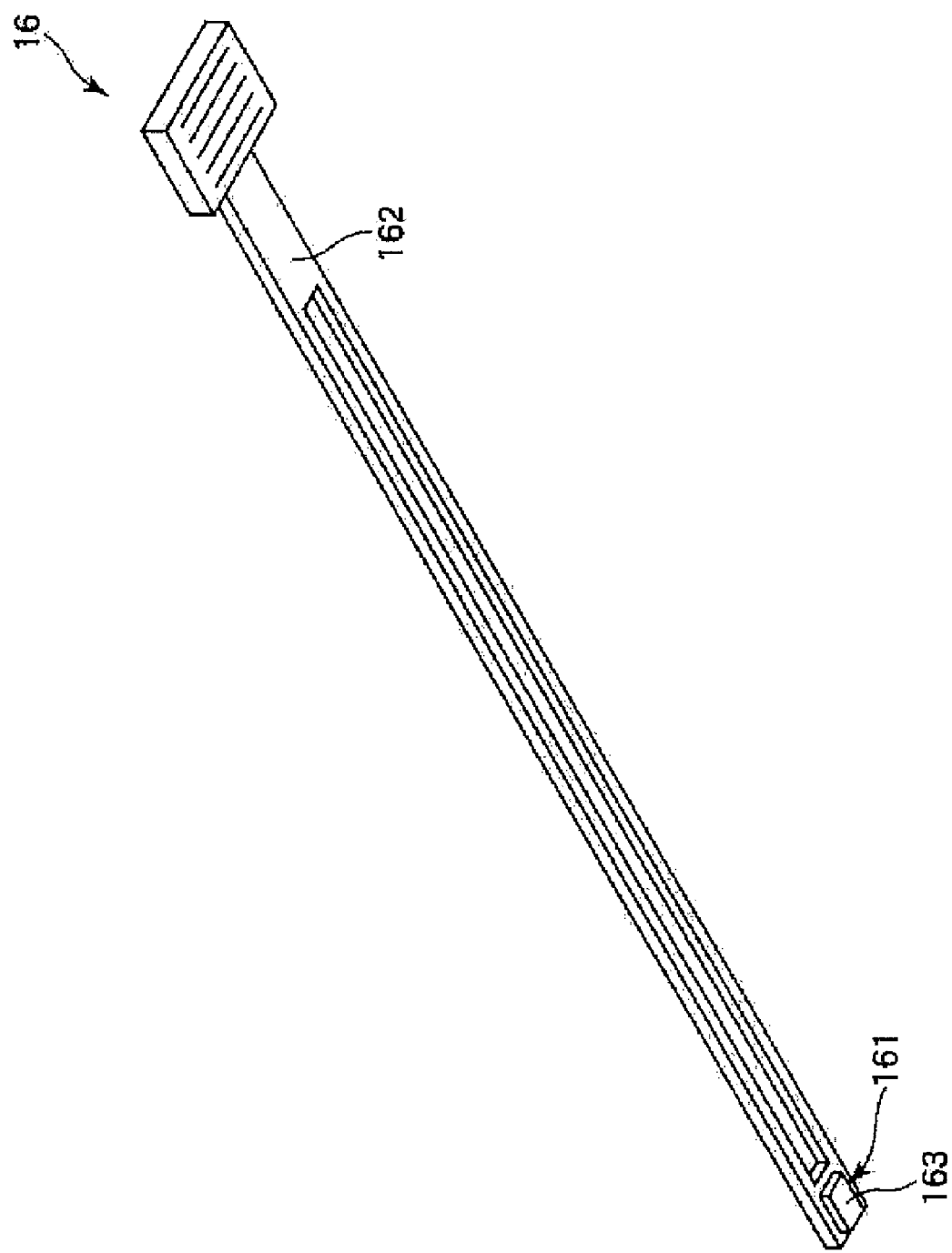
FIG. 7 is a perspective view illustrating the cleaner shown in FIG. 5 (similar for FIG. 6).
Figure 8:
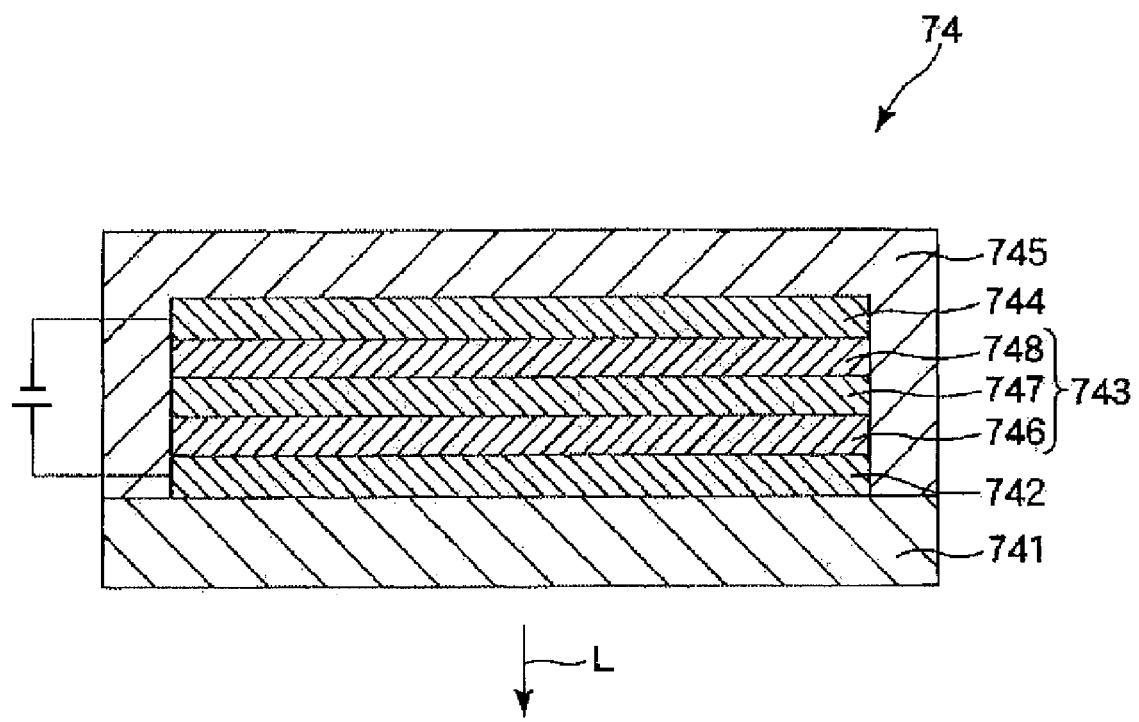
FIG. 8 is a longitudinal sectional view illustrating an example of the configuration of an organic EL element of the line head shown in FIG. 2.

FIG. 1 is a view schematically illustrating the overall configuration of an image forming apparatus according to an embodiment of the invention. FIG. 2 is a partially sectional perspective view illustrating a first embodiment of a line head included in the image forming apparatus shown in FIG. 1. FIG. 3 is a cross-sectional view taken along the line III-III of FIG. 2. FIG. 4 is a plan view illustrating the line head shown in FIG. 2. FIGS. 5 and 6 are longitudinal sectional views illustrating parts of a line head and a photoconductor of the image forming apparatus shown in FIG. 1 (FIG. 5 is a view illustrating a state where a cleaner is provided, and FIG. 6 is a view illustrating a state where cleaning is performed by using a cleaner). FIG. 7 is a perspective view illustrating the cleaner shown in FIG. 5 (similar for FIG. 6). FIG. 8 is a longitudinal sectional view illustrating an example of the configuration of an organic EL element of the line head shown in FIG. 2. FIGS. 9 to 14 are perspective views schematically illustrating operation states over time in the line head shown in FIG. 2. Moreover, in the following description, it is assumed that an upper side in FIGS. 1 to 3, 5, 6, and 8 to 14 is 'upper' or 'upward' and a lower side in the drawings is 'lower' or 'downward' for the convenience of explanation. In addition, in FIGS. 2, 5, and 6, a light shielding member is omitted.

An image forming apparatus 1 shown in FIG. 1 is an electrophotographic printer that records an image on a recording medium P by a series of image forming processes including an electrical charging process, an exposure process, a developing process, a transferring process, and a fixing process. In the present embodiment, the image forming apparatus 1 is a so-called a tandem type color printer.

As shown in FIG. 1, the image forming apparatus 1 includes: an image forming unit 10 for the electrical charging process, the exposure process, the developing process; a transfer unit 20 for the transferring process; a fixing unit 30 for the fixing process, a transport mechanism 40 for transporting the recording mediums P, such as paper; and a paper feed unit 50 that supplies the recording medium P to the transport mechanism 40.

The image forming unit 10 has four image forming stations of an image forming station 10Y that forms a yellow toner image, an image forming station 10M that forms a magenta toner image, an image forming station 10C that forms a cyan toner image, and an image forming station 10K that forms a black toner image.

Each of the image forming stations 10Y, 10C, 10M, and 10K has a photosensitive drum (photoconductor) 11 that carries an electrostatic latent image thereon. A charging unit 12, a line head (exposure unit) 13, a developing unit 14, and a cleaning unit 15 are provided around the periphery (outer peripheral side) of each of the image forming stations 10Y, 10C, 10M, and 10K. Since these units that form the image forming stations 10Y, 10C, 10M, and 10K have the same configurations, each one of the units will be hereinafter described.

The photosensitive drum 11 has a cylindrical shape as an overall shape. An outer peripheral surface (cylindrical surface) of the photosensitive drum 11 forms a light receiving surface 111 that receives light L (emitted light) from the line head 13 (second lens array 6'). That is, a photosensitive layer (not shown) is formed on the outer peripheral surface of the photosensitive drum 11. In addition, the photosensitive drum 11 can rotate around an axis line thereof in the arrow direction indicated in FIG. 1. In addition, a portion (both ends) of the outer peripheral surface of the photosensitive drum 11 excluding the light receiving surface 111 is a non-photosensitive region 112 that is not photosensitized by the light L.

The charging unit 12 uniformly charges the light receiving surface 111 of the photosensitive drum 11 by corona charging or the like.

The line head 13 receives image information from a host computer (not shown), such as a personal computer, and irradiates the light L toward the light receiving surface 111 of the photosensitive drum 11 in response to the image information. On the other hand, the light receiving surface 111 of the photosensitive drum 11 is uniformly charged, such that a latent image corresponding to an irradiation pattern of the light L is formed. In addition, the configuration of the line head 13 will be described in detail later.

The developing unit 14 has a reservoir (not shown) reserving toner therein and supplies toner from the reservoir to the light receiving surface 111 of the photosensitive drum 11 that carries an electrostatic latent image and applies toner thereon. As a result, the latent image on the photosensitive drum 11 is visualized (developed) as a toner image.

The cleaning unit 15 has a cleaning blade 151, which is made of rubber and abuts on the light receiving surface 111 of the photosensitive drum 11, and removes toner, which remains on the photosensitive drum 11 after the primary transfer to be described later, by scratching the remaining toner with the cleaning blade 151.

The transfer unit 20 collectively transfers toner images corresponding to respective colors, which are formed on the photosensitive drums 11 of the image forming stations 10Y, 10M, 10C, and 10K described above, onto the recording medium P.

In each of the image forming stations 10Y, 10C, 10M, and 10K, electrical charging of the light receiving surface 111 of the photosensitive drum 11 performed by the charging unit 12, exposure of the light receiving surface 111 performed by the line head 13, supply of toner to the light receiving surface 111 performed by the developing unit 14, primary transfer to an intermediate transfer belt 21 caused by pressure between the intermediate transfer belt 21 and a primary transfer roller 22 which will be described later, and cleaning of the light receiving surface 111 performed by the cleaning unit 15 are sequentially performed while the photosensitive drum 11 rotates once.

The transfer unit 20 has the intermediate transfer belt 21 having an endless belt shape. The intermediate transfer belt 21 is stretched over the plurality (four in the configuration shown in FIG. 1) of primary transfer rollers 22, a driving roller 23, and a driven roller 24. The intermediate transfer belt 21 is driven to rotate in the arrow direction shown in FIG. 1 and at approximately the same speed as a circumferential speed of the photosensitive drum 11 by rotation of the driving roller 23.

Each primary transfer roller 22 is provided opposite the corresponding photosensitive drum 11 with the intermediate transfer belt 21 interposed therebetween and serves to transfer (primary transfer) a monochrome toner image on the photosensitive drum 11 onto the intermediate transfer belt 21. A primary transfer voltage (primary transfer bias), which has an opposite polarity to that of electrically charged toner at the time of primary transfer, is applied to the primary transfer roller 22.

A toner image corresponding to at least one color of yellow, magenta, cyan, and black is carried on the intermediate transfer belt 21. For example, in the case when a full color image is formed, toner images corresponding to four colors of yellow, magenta, cyan, and black are sequentially transferred onto the intermediate transfer belt 21 so as to overlap one another, such that a full color toner image is formed as an intermediate transfer image.

In addition, the transfer unit 20 has a secondary transfer roller 25, which is provided opposite the driving roller 23 with the intermediate transfer belt 21 interposed therebetween, and a cleaning unit 26, which is provided opposite the driven roller 24 with the intermediate transfer belt 21 interposed therebetween.

The secondary transfer roller 25 serves to transfer (secondary transfer) a monochrome or full-color toner image (intermediate transfer image), which is formed on the intermediate transfer belt 21, onto the recording mediums P, such as paper, a film, and cloth, supplied from the paper feed unit 50. At the time of secondary transfer, the secondary transfer roller 25 is pressed against the intermediate transfer belt 21 and a secondary transfer voltage (secondary transfer bias) is applied to the secondary transfer roller 25. The driving roller 23 also functions as a backup roller of the secondary transfer roller 25 at the time of such secondary transfer.

The cleaning unit 26 has a cleaning blade 261, which is made of rubber and abuts on a surface of the intermediate transfer belt 21, and removes toner, which remains on the intermediate transfer belt 21 after the secondary transfer, by scratching the remaining toner with the cleaning blade 261.

The fixing unit 30 has a fixing roller 301 and a pressure roller 302 pressed against the fixing roller 301 and is configured such that the recording medium P passes between the fixing roller 301 and the pressure roller 302. In addition, a heater that heats an outer peripheral surface of the fixing roller is built inside the fixing roller 301 so that the recording medium P passing between the fixing roller 301 and the pressure roller 302 can be heated and pressed. By the fixing unit 30 having such a configuration, the recording medium P having a secondary-transferred toner image thereon is heated and pressed, such that the toner image is heat-fixed on the recording medium P. As a result, the toner image is fixed as a permanent image.

The transport mechanism 40 calculates timing of paper feeding to a secondary transfer portion between the secondary transfer roller 25 and the intermediate transfer belt 21 described above and has a pair of resist roller pairs 41, which transport the recording medium P, and pairs of transport rollers 42, 43, and 44 that transport only the recording medium P, on which the fixing process in the fixing unit 30 has been completed, with the recording medium P pinched between each of the pairs of transport rollers 42, 43, and 44.

In the case where an image is formed on only one surface of the recording medium P, the transport mechanism 40 transports the recording medium P, one surface of which has been subjected to fixing processing by the fixing unit 30, using the pair of transport rollers 42 with the recording medium P pinched between the pair of transport rollers 42, such that the recording medium P is ejected to the outside of the image forming apparatus 1. In addition, in the case where images are formed on both surfaces of the recording medium P, the recording medium P one surface of which has been subjected to fixing processing by the fixing unit 30 is first pinched by the pair of transport rollers 42. Then, the pair of transport rollers 42 is reversely driven and the pairs of transport rollers 43 and 44 are driven to thereby reverse the recording medium P and cause the recording medium P to return to the pair of resist rollers 41. Then, an image is formed on the other surface of the recording medium P by executing the same operation as described earlier.

The paper feed unit 50 is provided with a paper feed cassette 51, which accommodates therein the recording medium P that is not used, and a pickup roller 52 that feeds the recording medium P from the paper feed cassette 51 toward the pair resist rollers 41 one at a time.

Next, a first embodiment of a line head will be described. In addition, in the following description, the longitudinal direction of a first lens array 6 which is long is referred to as a 'main scanning direction' and the width direction of the first lens array 6 is referred to as a 'sub-scanning direction' for the convenience of explanation.

As shown in FIG. 3, the line head 13 according to the present embodiment is arranged below the photosensitive drum 11 so as to be opposite to the light receiving surface 111 of the photosensitive drum 11. The line head 13 includes the first lens array 6, a second light shielding member 8', a second lens array 6', a first light shielding member 8, a light-emitting element array 7, and a casing 9 that contains those members therein, which are sequentially arranged from a side of the photosensitive drum 11. In the line head 13, when the light L is irradiated from the light-emitting element array 7, the light L is incident on the first lens array 6 through the first light shielding member 8. The light L incident on the first lens array 6 is incident on the second lens array 6' through the second light shielding member 8'. The light L incident on the second lens array 6' is transmitted through the second lens array 6' and is then emitted through the photosensitive drum 11.

First, the first lens array 6 will be described.

As shown in FIGS. 2 and 4, the first lens array 6 is formed by using a plate-shaped body having a long appearance.

As shown in FIG. 3, a plurality of spherical surfaces, that is, convex surfaces 62 are formed on a lower surface (incidence surface) 61 of the first lens array 6 on which the light L is incident. In addition, a convex surface formed on the lower surface 61 is not formed but a flat surface is formed as an upper surface (emission surface) 63 of the first lens array 6 from which the light L is emitted. When the light L is irradiated from the light-emitting element array 7, the light L is incident on each of the convex surfaces 62 and is then emitted from the upper surface 63. In the first lens array 6, each portion surrounded by a dashed-dotted line in FIG. 3 is a first lens 64 which functions as an optical path. Moreover, in the present embodiment, a portion (mainly, a portion around the first lens 64) of the first lens array 6 excluding the first lens 64, that is, a portion of the first lens array 6 not functioning as an optical path is referred to as a first lens support portion 65.

The first lens 64 is a plano-convex lens having a convex surface 62 as a surface on a side of incidence of the light L and a flat surface as a surface on a side of emission of the light L. In addition, as described above, the upper surface 63 of the first lens array 6 is a flat surface. By making a surface of the first lens 64, on which the light L is incident, as the convex surface 62, a distance between an incidence surface (convex surface 62') of a second lens, which will be described later, and the incidence surface of the first lens 64 can be set large compared with a case in which a surface of the first lens 64 from which the light L is emitted is made as a convex surface. Thus, since it is possible to make long the distance between the incidence surface of the first lens 64, in which aberration correction is possible, and the incidence surface of the second lens 64', in which the aberration correction is possible in the same manner, a degree of freedom of aberration correction is increased in the entire optical system. As a result, the aberration correction capability is improved.

As shown in FIGS. 2 and 4, the first lenses 64 formed as plano-convex lenses are separated from each other, are arranged in plural columns in the main scanning direction, and are arranged in plural rows in the sub-scanning direction. In the present embodiment, the plurality of first lenses 64 are arranged in a matrix of three rows by 'n' columns ('n' is an integer of two or more). In addition, among the three first lenses 64 belonging to one column (lens array), the first lens 64 positioned in the middle is referred to as a 'first lens 64b', the first lens 64 positioned at a left side in FIG. 3 (upper side in FIG. 4) is referred to as a 'first lens 64a', and the first lens 64 positioned at a right side in FIG. 3 (lower side in FIG. 4) is referred to as a 'first lens 64c' in the following description.

As shown in FIG. 3, in the three first lenses 64 belonging to one lens column, the first lenses 64a and 64c are arranged such that lens axes 641 of the first lenses 64a and 64c are symmetrical with respect to a lens axis 641 of the lens 64b.

As shown in FIGS. 2 and 4, in each lens column, the first lenses 64a to 64c are sequentially arranged so as to deviate from each other by an equal distance in the main scanning direction (right direction in FIG. 4). That is, in each lens column, a line that connects lens centers of the first lenses 64a to 64c to one another is inclined at a predetermined angle with respect to the main scanning direction. In addition, the amount of deviation between the first lenses 64 will be described in detail later.

Each of the first lenses 64 is preferably formed of a resin material and/or a glass material, for example.

As for this resin material, a variety of resin materials can be used, and examples thereof include liquid crystal polymers such as polyamides, thermoplastic polyimides and polyamideimide aromatic polyesters; polyolefins such as polyphenylene oxide, polyphenylene sulfide and polyethylene; modified polyolefins, polyesters such as polycarbonate, acrylic (methacrylic) resins, polymethyl methacrylate, polyethylene terephthalate and polybutylene terephthalate; thermoplastic resins such as polyethers, polyether ether ketones, polyetherimide and polyacetal; thermosetting resins such as epoxy resins, phenolic resins, urea resins, melamine resins, unsaturated polyester resins and polyimide resins; photocurable resins; and the like. These can be used individually or in combination of two or more species.

In addition, as the glass material, various kinds of glass materials, such as soda glass, crystalline glass, quartz glass, lead glass, potassium glass, borosilicate glass, alkali-free glass, and the like may be mentioned.

In addition, preferably, a portion of the first lens 64 around the convex surface 62 is formed of a resin material and a portion of the first lens 64 excluding the convex surface 62 is formed of a glass material. In the first lens 64 in this case, the portion around the convex surface 62, which is formed of a resin material, and the portion excluding the convex surface 62, which is formed of a glass material, are excellent in adhesion for a long time. Accordingly, the life of the line head 13 provided with such a first lens array 6 can be extended. In addition, it becomes easy to manufacture the first lens array 6.

Furthermore, even though the first lens support portion 65 may also be formed of the resin material or the glass material described above, the first lens support portion 65 is preferably formed of the glass material. In particular, the first lens support portion 65 is preferably formed of the same glass material as that used for the first lens 64. In the case where the first lens 64 and the first lens support portion 65 are formed of the same glass material, the first lens array 6 may be configured as an integrally molded body in which the first lens 64 and the first lens support portion 65 are integrally molded. Thus, when manufacturing the first lens array 6, the manufacture can be performed easily. In addition, it is possible to obtain the first lens array 6 which is highly stable against an environmental variation. In addition, the same is true for a case in which the first lens 64 and the first lens support portion 65 are integrally molded by using a resin material.

In addition, the first lens array 6 may be obtained by forming a plate-shaped member having upper and lower surfaces, which are flat surfaces, and forming a plurality of convex portions, which protrude in the shape of a spherical surface, on one of the surfaces of the member, for example. In this case, the plate-shaped member may be formed of a glass material and each convex portion may be formed of a resin material, for example.

Moreover, in the case where the first lens array 6 is formed as an integrally molded body, the lower surface 61 of the integrally molded body on which the light L is incident is a flat surface, and emission surfaces of the first lenses 64 are positioned on the same plane. When manufacturing the first lens array 6, the entire upper surface 63 can be easily and reliably formed flat by performing a grinding (polishing) process once, for example.

Next, the second lens array 6' will be described

As shown in FIGS. 2 and 4, the second lens array 6' is formed by using a plate-shaped body having a long appearance.

The second lens array 6' is arranged at the light-emitting surface side of the first lens array 6 described above so as to be opposite to the first lens array 6 with the second light shielding member 8' interposed therebetween.

As shown in FIG. 3, a plurality of spherical surfaces, that is, convex surfaces 62' are formed on a lower surface (incidence surface) 61' of the second lens array 6' on which the light L is incident. That is, the convex surface 62' is formed so as to be opposite to the upper surface 63 of the first lens array 6 described above. In addition, a convex surface formed on the lower surface 61' is not formed but a flat surface is formed as an upper surface (emission surface) 63' of the second lens array 6' from which the light L is emitted. The light L which has been transmitted through the first lens array 6 described above is incident on each convex surface 62' and is then emitted from the upper surface 63'. In the second lens array 6', a portion surrounded by a dashed-dotted line in FIG. 3 is a second lens 64' which functions as an optical path. Moreover, in the present embodiment, a portion (mainly, a portion around the second lens 64') of the second lens array 6' excluding the second lens 64', that is, a portion of the second lens array 6' not functioning as an optical path is referred to as a second lens support portion 65'. In addition, the second lens 64' and the second lens support portion 65' may be formed by using the same materials as the first lens 64 and the first lens support portion 65 described above, and accordingly, an explanation thereof will be omitted.

The plurality of second lenses 64' are arranged at the positions corresponding to the plurality of first lenses 64 of the first lens array 6 described above.

The second lens 64' is a plano-convex lens having a convex surface 62' as a surface on a side of incidence of the light L and a flat surface as a surface on a side of emission of the light L. Moreover, as described above, the upper surface 63' of the second lens array 6' is a flat surface, and emission surfaces 643 of the second lenses 64' on which the light L is incident are positioned on the same plane.

In addition, in the same manner as the first lens array 6, the second lenses 64' formed as plano-convex lenses are separated from each other, are arranged in plural columns in the main scanning direction, and are arranged in plural rows in the sub-scanning direction, as shown in FIGS. 2 and 4. In the present embodiment, the plurality of second lenses 64' are arranged in a matrix of three rows by 'n' columns ('n' is an integer of two or more), in the same manner as the first lens array 6. In addition, among the three second lenses 64' belonging to one column (lens array), the second lens 64' positioned in the middle is referred to as a second lens 64'b, the second lens 64' positioned at a left side in FIG. 3 (upper side in FIG. 4) is referred to as a second lens 64'a, and the second lens 64, positioned at a right side in FIG. 3 (lower side in FIG. 4) is referred to as a second lens 64'c in the following description.

Furthermore, in the same manner as the first lens array 6 described above, in each lens column, the second lenses 64'a to 64'c are sequentially arranged so as to deviate from each other by an equal distance in the main scanning direction (right direction in FIG. 4). That is, in each lens column, a line that connects lens centers of the second lenses 64'a to 64'c to one another is inclined at a predetermined angle with respect to the main scanning direction. In addition, the amount of deviation between the second lenses 64' will be described in detail later together with the amount of deviation between the first lenses 64 described above.

As shown in FIG. 3, in the three second lenses 64' belonging to one lens column, the second lenses 64'a and 64'c are arranged such that lens axes 641 of the second lenses 64'a and 64'c are symmetrical with respect to a lens axis 641 of the second lens 64'b.

Moreover, in the second lenses 64'a to 64'c, the emission surface 643 of the second lens 64'b is arranged at the position closest to the light receiving surface 111 of the photosensitive drum 11, and the emission surfaces 643 of the second lenses 64'a and 64'c are arranged at the positions that are more distant from the light receiving surface 111 of the photosensitive drum 11 than the emission surface 643 of the second lens 64'b.

In the first lens array 6 and the second lens array 6' having the configurations described above, the first lens 64 and the second lens 64' arranged at the position corresponding to the first lens 64 form a lens pair. In the following description, it is assumed that a pair of the first lens 64a and the second lens 64'a is a lens pair a, a pair of the first lens 64b and the second lens 64'b is a lens pair b, and a pair of the first lens 64c and the second lens 64'c is a lens pair c.

In each of the lens pair a, the lens pair b, and the lens pair c arranged as described above, a condensing point (focal point) 642 is formed on the light receiving surface 111 of the photosensitive drum 11 by the light L that is transmitted through the lens pair a, the lens pair b, and the lens pair c. Among the condensing points 642, a distance from the condensing point 642 of the lens pair a to the emission surface 643 (upper surface 63') thereof is approximately equal to a distance from the condensing point 642 of the lens pair c to the emission surface 643 (upper surface 63') thereof. In addition, a distance from the emission surface 643 of the lens pair b to the condensing point 642 thereof is shorter than the distance between the condensing point 642 of the lens pair a (similar for the lens pair c) and the emission surface 643 thereof.

For this reason, the lens pair a and the lens pair c are configured such that focal distances (imaging distances) are equal, and the lens pair a (similar for the lens pair c) and the lens pair b are configured such that focal distances are different from each other.

Such optical characteristics are obtained, for example, by making radii of curvature (shapes) of the convex surfaces 62' of the second lenses 64'a to 64'c equal, making radii of curvature (shapes) of the convex surfaces 62' of the first lenses 64a and 64c equal, and making radii of curvature of the convex surfaces 62 of the first lens 64a (similar for the first lens 64c) and the first lens 64b different. Specifically, the radius of curvature of the convex surface 62 of the first lens 64b is smaller than that of the convex surface 62 of the first lens 64a. In addition, the radii of curvature of the convex surface 62 and the convex surface 62' is set such that the light L that is transmitted through the lens pair a, the lens pair b, and the lens pair c is condensed on the light receiving surface 111 of the photosensitive drum 11 when the light L is irradiated toward the lens pair a, the lens pair b, and the lens pair c from the light-emitting element array 7.

In addition, such optical characteristics may also be obtained by making radii of curvature (shapes) of the convex surfaces 62 of the first lenses 64a to 64c equal, making radii of curvature (shapes) of the convex surfaces 62' of the second lenses 64'a and 64'c equal, and making radii of curvature of the convex surfaces 62' of the second lens 64'a (similar for the second lens 64'c) and the second lens 64'b different.

Furthermore, in the present embodiment, the first lens array 6 and the second lens array 6' are arranged to be in contact with each other, and the upper surface 63 of the first lens array 6 and the convex surface 62' of the second lens array 6' are arranged to abut each other. Thus, positioning of the convex surface 62 of each of the first lenses 64 of the first lens array 6 and each convex surface 62' of the second lens array 6' in the up and down direction of FIG. 3 is made.

A distance between the convex surface 62 of each of the first lenses 64 and the convex surface 62' of the second lens 64' corresponding to the convex surface 62 is one of the important conditions (elements) when determining positioning of the condensing point 642 on the light receiving surface 111 in the up and down direction of FIG. 3. Since this distance is reliably regulated by causing the upper surface 63 of the first lens array 6 and the convex surface 62' of the second lens array 6' to abut each other, it is possible to obtain the image forming apparatus 1 that is highly precise and reliable.

As shown in FIGS. 2 and 3, at a side of the first lens array 6 on which the light L is incident, the light-emitting element array 7 is provided with the first light shielding member 8 interposed therebetween. The light-emitting element array 7 has a plurality of light-emitting element groups 71 and a supporting plate (head substrate) 72.

The supporting plate 72 serves to support each of the light-emitting element groups 71 and is formed by using a plate-shaped body having a long appearance. This supporting plate 72 is arranged parallel to the first lens array 6.

In addition, the length of the supporting plate 72 in the main scanning direction is larger than that of the first lens array 6 in the main scanning direction. The length of the supporting plate 72 in the sub-scanning direction is set to be also larger than that of the first lens array 6 in the sub-scanning direction.

Constituent materials of the supporting plate 72 are not specially limited. For example, various kinds of metal materials, such as aluminum and stainless steel, or various kinds of plastics may be used individually or in combination thereof. In the case when the supporting plate 72 is formed by using various kinds of metal materials, heat generated by emission of the light-emitting element 74 can be efficiently dissipated through the supporting plate 72. In addition, in the case when the supporting plate 72 is formed by using various kinds of plastics, the weight of the supporting plate 72 is reduced.

A box-shaped accommodating portion 73 is provided on a bottom surface side of the supporting plate 72. The plurality of light-emitting element groups 71, wiring lines (not shown) electrically connected to the light-emitting element groups 71 (light-emitting elements 74), or a circuit board (not shown) used to drive the light-emitting elements 74 are accommodated in the accommodating portion 73.

In the same manner as the plurality of first lenses 64 described above, the plurality of light-emitting element groups 71 are separated from each other and arranged in a matrix of three rows by 'n' columns ('n' is an integer of two or more) (for example, refer to FIG. 4). Each of the plurality of light-emitting element groups 71 arranged in this way corresponds to each of the first lenses 64 (similar for the second lens 64'). In addition, each of the light-emitting element groups 71 is configured to include the plurality of light-emitting elements 74 (eight light-emitting elements 74 in the present embodiment). Moreover, the light-emitting elements 74 which form each of the light-emitting element groups 71 are configured such that luminous wavelengths of the light-emitting elements 74 are equal.

As shown in FIG. 3, the eight light-emitting elements 74 that form each of the light-emitting element groups 71 are arranged on the same plane as a lower surface 721 of the supporting plate 72. The light L emitted from each of the light-emitting elements 74 forms the condensing point 642 on the light receiving surface 111 of the photosensitive drum 11 through the corresponding first lens 64 and second lens 64'.

In addition, as shown in FIG. 4, the eight light-emitting elements 74 are separated from each other, are arranged in four columns in the main scanning direction, and are arranged in two rows in the sub-scanning direction. Thus, the eight light-emitting elements 74 are arranged in a matrix of two rows by four columns. The two light-emitting elements 74, which belong to one column (column of light-emitting elements) and are adjacent to each other, are arranged so as to deviate from each other in the main scanning direction.

The amount of deviation is not specially limited. For example, the amount of deviation is preferably set to the extent described below. In addition, for the convenience of explanation, the eight light-emitting elements 74 belonging to the light-emitting element group 71 located at a first row and a first column will be described as a representative example. In addition, a 'number' is given to each of the eight light-emitting elements 74. These numbers are Nos. 1, 2, 3, 4, 5, 6, 7, and 8 sequentially from the light-emitting element 74, which is located at a lower right side in FIG. 4, toward an upper left side (for example, refer to FIG. 9 for the numbers).

Figure 9:
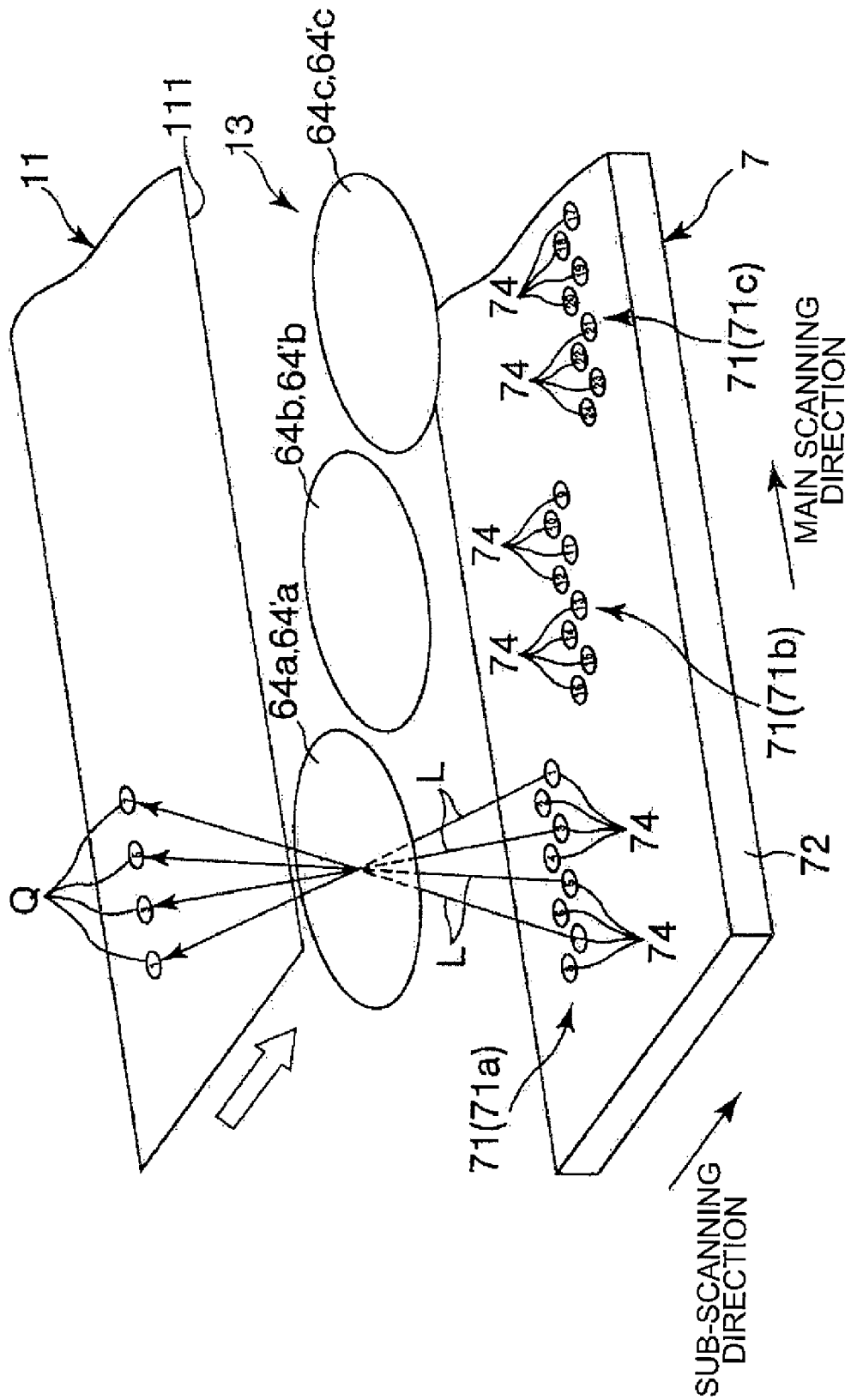
FIG. 9 is a perspective view schematically illustrating an operation state over time in the line head shown in FIG. 2.

As shown in FIG. 9, in the light-emitting elements 74 corresponding to Nos. 1 to 8, the light-emitting elements 74 corresponding to No. 8 and the light-emitting elements 74 corresponding to No. 6, which are adjacent to each other in the main scanning direction, are deviated from each other such that the light-emitting elements 74 corresponding to No. 7 is supplemented (buried) between the light-emitting elements 74 corresponding to No. 8 and the light-emitting elements 74 corresponding to No. 6. Similarly, the light-emitting elements 74 corresponding to No. 5 is supplemented between the light-emitting elements 74 corresponding to No. 6 and the light-emitting elements 74 corresponding to No. 4, and the light-emitting elements 74 corresponding to No. 3 is supplemented between the light-emitting elements 74 corresponding to No. 4 and the light-emitting elements 74 corresponding to No. 2.

In this manner, in the eight light-emitting elements 74 arranged in a matrix of two rows by four columns, one light-emitting element 74 located at a next row is supplemented between the light-emitting elements 74 that are adjacent to each other in the main scanning direction.

There is a limitation in arranging the eight light-emitting elements 74 as densely as possible in one row, for example. However, it is possible to increase the arrangement density of the light-emitting elements 74 by arranging the eight light-emitting elements 74 so as to deviate from each other as described above. In this way, the recording density of the recording medium P when recording an image on the recording medium P is further increased. As a result, the recording medium P on which an image, which has high resolution and multiple gray-scale levels and is clear, is carried is obtained.

In addition, although the eight light-emitting elements 74 belonging to one light-emitting element group 71 are arranged in a matrix of two rows by four columns in the present embodiment, the arrangement shape is not limited thereto. For example, the eight light-emitting elements 74 belonging to one light-emitting element group 71 may be arranged in a matrix of four rows by two columns.

As described above, the plurality of light-emitting element groups 71 are arranged in a matrix of three rows by n columns so as to be separated from each other. As shown in FIG. 4, the three light-emitting element groups 71 belonging to one column (column of light-emitting element groups) are arranged so as to deviate from each other by an equal distance in the main scanning direction (right direction in FIG. 4).

The amount of deviation is not specially limited. For example, the amount of deviation is preferably set to the extent described below. In addition, for the convenience of explanation, the light-emitting element group 71 located at a first column (leftmost column) in FIG. 4 will be described as a representative example. Moreover, it is assumed that the light-emitting element group 71 located at a first row and a first column in FIG. 4 (similar for FIGS. 9 to 14) is a 'light-emitting element group 71a', the light-emitting element group 71 located at a second row and a first column is a 'light-emitting element group 71b', the light-emitting element group 71 located at a third row and a first column is a 'light-emitting element group 71c', and the light-emitting element group 71 located at a first row and a second column is a 'light-emitting element group 71d'.

The light-emitting element groups 71a to 71c are deviated from each other such that the light-emitting element group 71b is supplemented between the light-emitting element groups 71a and 71d and a remaining portion (half), which cannot be supplemented by the light-emitting element group 71*b*, is supplemented by the light-emitting element group 71*c*.

Thus, in the light-emitting element groups 71 arranged in a matrix of three rows by n columns, the light-emitting element group 71 located at a next row and the light-emitting element group 71 located at a row after the next row are sequentially supplemented between the light-emitting element groups 71 adjacent to each other.

There is a limitation in arranging the plurality of light-emitting element groups 71 as densely as possible in one row, for example. However, it is possible to increase the arrangement density of the light-emitting element groups 71 by arranging the plurality of light-emitting element groups 71 so as to deviate from each other as described above. In this way, in combination with the fact that the eight light-emitting elements 74 within one light-emitting element group 71 are arranged so as to deviate from each other, the recording density of the recording medium P when recording an image on the recording medium P is further increased. As a result, the recording medium P on which an image, which has high resolution, multiple gray-scale levels, and high color reproducibility and is clearer, is carried is obtained.

In addition, the light-emitting element groups 71 belonging to the same row (light-emitting element row) of one light-emitting element group 71 are switched on/off at the same timing. The circuit board is configured to perform such control.

In addition, even between the first lenses 64 of the first lens array 6 and between the second lenses 64' of the second lens array 6', the same amount of deviation is applied.

As shown in FIG. 8, each light-emitting element 74 is formed by using an organic EL element (organic electroluminescent element).

The light-emitting element 74 shown in FIG. 8 includes a substrate 741, an anode 742 provided on the substrate 741, an organic EL layer 743 provided on the anode 742, a cathode 744 provided on the organic EL layer 743, and a protective layer 745 provided to cover the above layers 742, 743, and 744.

In addition, the organic EL layer 743 is a laminated body having a plurality of layers obtained by laminating a hole transport layer 746, a light-emitting layer 747, and an electron transport layer 748 sequentially from a side of the anode 742.

In addition, when a DC voltage is applied between the anode 742 and the cathode 744, electrons transported through the electron transport layer 748 and holes transported through the hole transport layer 746 are recombined in the light-emitting layer 747. Due to energy emitted at the time of the recombination, exciton is generated. In addition, when the exciton returns to a ground state, energy (fluorescent light or phosphorescent light) is emitted. That is, the light-emitting element 74 (light-emitting layer 747) emits light.

In the present embodiment, the light-emitting element 74 is an element having a bottom emission structure in which the light L emitted from the light-emitting layer 747 is taken out to a side of the anode 742 so as to be visualized. Accordingly, the light-emitting element 74 is supported by the supporting plate 72 such that a surface of the light-emitting element 74 facing the substrate 741 becomes a side of the first lens array 6.

The substrate 741 serves to support the light-emitting element 74, and the layers described above are formed on the substrate 741.

The substrate 741 has an insulation property and is substantially transparent (transparent and colorless, transparent with a color, or translucent). Such materials include resin materials, such as polyethylene terephthalate, polyethylenenaphthalate, polypropylene, cycloolefin polymer, polyamide, polyethersulfone, polymethylmethacrylate, polycarbonate, and polyarylate, and glass materials, such as quartz glass and soda glass, for example. These can be used individually or in combination of two or more species.

The anode 742 is an electrode serving to inject holes into the organic EL layer 743 (hole transport layer 746 to be described later). A constituent material of the anode 742 is not specially limited. For example, an oxide, such as ITO (indium tin oxide), $SnO_2$, $SnO_2$ containing Sb, and ZnO containing Al, Au, Pt, Ag, Cu, or an alloy containing those described above may be mentioned. At least one of those materials may be used.

The cathode 744 is an electrode serving to inject electrons into the organic EL layer 743 (electron transport layer 748 to be described later). In addition, the cathode 744 also functions as a reflecting film which reflects the light L, which has leaked toward the cathode 744, toward the anode 742. Thus, a larger amount of light emitted toward the first lens array 6 can be secured.

Constituent materials of the cathode 744 includes Li, Mg, Ca, Sr, La, Ce, Er, Eu, Sc, Y, Yb, Ag, Cu, Al, Cs, and Rb and an alloy containing those described above. At least one of those described above may be used as a material of the cathode 744.

The organic EL layer 743 is provided between the anode 742 and the cathode 744. As described above, the organic EL layer 743 includes the hole transport layer 746, the light-emitting layer 747, and the electron transport layer 748. The hole transport layer 746, the light-emitting layer 747, and the electron transport layer 748 are formed on the anode 742 in this order.

The hole transport layer 746 has a function of transporting holes, which are injected from the anode 742, up to the light-emitting layer 747.

Any kind of material may be used as a constituent material (hole transport material) of the hole transport layer 746 as long as the material has a hole transporting capability. Preferably, a conjugated compound is used. Since the conjugated compound can transport holes very smoothly due to its unique property caused by broadening of electron cloud, the conjugated compound is especially excellent in the hole transporting capability.

Examples of such hole transport material include arylcycloalkane-based compounds such as 1,1-bis-(4-diparatriaminophenyl)cyclohexane; arylamine-based compounds such as 4,4',4''-trimethyltriphenylamine; phenylenediamine-based compounds such as N,N,N', N'*tetraphenylparaphenylenediamine; triazole-based compounds such as triazole; imidazole-based compounds such as imidazole; oxadiazole-based compounds such as 1,3,4-oxadiazole; anthracene-based compounds such as anthracene; fluorenone-based compounds such as fluorenone; aniline-based compounds such as polyaniline; phthalocyanine-based compounds such as phthalocyanine; and the like. These can be used individually or in combination of two or more species.

The electron transport layer 748 has a function of transporting electrons, which are injected from the cathode 744, up to the light-emitting layer 747.

Examples of the constituent material of the electron transport layer 748 (electron transport material) include benzene-based compounds such as 1,3,5-tris[(3-phenyl-6-trifluoromethyl)quinoxalin-2-yl]benzene (TPQ1) (star-burst compounds); naphthalene-based compounds such as naphthalene, phenanethrene-based compounds such as phenanthrene; chrysene-based compounds such as chrysene; perylene-based compounds such as perylene; anthracene-based compounds such as anthracene; oxadiazole-based compounds such as oxadiazole; triazole-based compounds such as triazole; and the like. These can be used individually or in combination of two or more species.

In addition, any kind of light-emitting layer 747 may be adopted as long as the light-emitting layer 747 is formed of a constituent material which allows holes from the anode 742 and electrons from the cathode 744 to be injected into the light-emitting layer 747 at the time of voltage application and which allows the holes and the electrons to be recombined.

As for the constituent material of such light-emitting layer 747 (light-emitting material), there may be mentioned benzene-based compounds such as 1,3,5-tris[(3-phenyl-6-trifluoromethyl)quinoxalin-2-yl]benzene (TPQ1) and 1,3,5-tris[{3-(4-t-butylphenyl)-6-trisfluoromethyl}quinoxalin-2-yl]benzene (TPQ2); metal-associated or metal-free phthalocyanine-based compounds such as phthalocyanine, copper phthalocyanine (CuPc) and iron phthalocyanine; low molecular weight systems such as tris(8-hydroxyquinolinolato)aluminum ($Alq_3$) and factris(2-phenylpyridine)iridium ($Ir(ppy)_3$); or high molecular weight systems such as oxadiazole-based polymers, triazole-based polymers and carbazole-based polymers. These can be used individually or in combination of two or more species, so as to obtain the light L having the desired luminescent color.

In the present embodiment, each of the light-emitting elements 74 is configured to emit red light. Here, examples of the light-emitting layer 747 which emits red light, include (4-dicyanomethylene) 2-methyl-6-paradimethylaminostyryl)-4H-pyrane (DCM), Nile Red and the like. In addition, each of the light-emitting elements 74 is not limited to being configured to emit red light, but the light-emitting elements 74 may be configured to emit single-colored light having another color or white light. Thus, in the organic EL element, the light L emitted from the light-emitting layer 747 may be appropriately set to single-colored light having an arbitrary color in accordance with a constituent material of the light-emitting layer 747.

The protective layer 745 is provided so as to cover the layers 742, 743, and 744 which form the light-emitting element 74. This protective layer 745 has a function of sealing the layers 742, 743, and 744, which form the light-emitting element 74, in an airtight manner and has a function of blocking oxygen and moisture. By providing the protective layer 745, effects, such as an improvement in reliability of the light-emitting element 74 and prevention of a change in quality and deterioration, are acquired.

As a constituent material of the protective layer 745, the same constituent material as the substrate 741 may be used, for example.

Each light-emitting element 74 is formed by using such an organic EL element. In this manner, a pitch between the light-emitting elements 74 can be set to be relatively small. Accordingly, the recording density of the recording medium P when recording an image on the recording medium P is relatively increased. As a result, the recording medium P on which a clearer image is carried is obtained.

In addition, an optical path adjusting member, such as a reflector, may be provided at an outer peripheral side of each of the light-emitting elements 74 in order to prevent broadening of the light L.

As shown in FIG. 3, the first light shielding member 8 is provided between the first lens array 6 and the light-emitting element array 7. The first light shielding member 8 serves to prevent crosstalk between the light components L of the light-emitting element groups 71 adjacent to each other.

The first light shielding member 8 is formed by using a block body having a long appearance. A plurality of through holes 84 which pass through the first light shielding member 8 in the up and down direction (thickness direction) of FIG. 3 are formed in the first light shielding member 8 formed of a block body. Each of the through holes 84 is arranged at the position corresponding to each of the first lenses 64 and forms an optical path from the light-emitting element group 71 to the first lens 64 corresponding thereto. In addition, each of the through holes 84 has a circular shape in plan view and includes thereinside the eight light-emitting elements 74 of the light-emitting element group 71 corresponding to the through hole 84.

In addition, even though each through hole has a cylindrical shape in the configuration shown in FIG. 3, the invention is not limited thereto. For example, each through hole may have a circular truncated cone shape which expands upward.

In addition, the cross sectional shape of the first light shielding member 8 is a rectangular shape. That is, an upper surface 81 and a lower surface 82 of the first light shielding member 8 are parallel to each other, and side surfaces 83 of the first light shielding member 8 are also parallel to each other. The upper surface 81 abuts on the lower surface 61 of the first lens array 6, and the lower surface 82 abuts on the upper surface 722 of the supporting plate 72 of the light-emitting element array 7. At least one of the upper surface 81 and the lower surface 82 may be fixed by bonding (bonding using adhesive or solvent), for example.

Both ends of the through hole 84 are sealed by the convex surface 62 of the first lens 64 corresponding to the through hole 84 and the upper surface 722 of the light-emitting element array 7. That is, in the line head 13, a closed space is formed by an inner peripheral surface 841 of each through hole 84, the convex surface 62 of the first lens 64 corresponding to the through hole 84, and the upper surface 722 of the light-emitting element array 7.

When the light L is emitted from each light-emitting element 74, the light L is certainly incident on the first lens 64, which partitions the closed space, through the corresponding closed space (through hole 84). Accordingly, the light L emitted from the light-emitting element 74 is incident on only the first lens 64 corresponding to the light-emitting element 74 and is prevented from being incident on the other first lenses 64 adjacent thereto, for example. That is, crosstalk between the light components L of the light-emitting element groups 71 adjacent to each other is reliably prevented. As a result, a clear image can be reliably formed.

In addition, since it is prevented that a foreign matter enters into the closed space, it is prevented that the foreign matter adheres to each convex surface 62. Accordingly, each of the convex surfaces 62 is kept clean.

Moreover, in the first light shielding member 8, it is preferable that at least the inner peripheral surface 841 of each through hole 84 has a dark color, such as black, brown, or dark blue. In this way, it is possible to prevent the light L from being reflected from the inner peripheral surface 841 of the through hole 84 when the light L is transmitted through the through hole 84. Consequently, when the light L is reflected from the inner peripheral surface 841, the reflected light L can be prevented from being incident on the other first lenses 64. In addition, even if the reflected light L is not incident on the other first lenses 64, it is possible to prevent that the light L is not imaged in a portion of the light receiving surface 111 where an image is to be formed but image blur occurs.

Furthermore, as described above, the first light shielding member 8 is fixed in a state where the upper surface 81 and the lower surface 82 thereof abut on the first lens array 6 and the light-emitting element array 7, respectively. Since the thickness of the first light shielding member 8 is constant, a gap length that is a distance between the first lens array 6 and the light-emitting element array 7 is regulated. Thus, positioning of the convex surface 62 of each of the first lenses 64 of the first lens array 6 and each light-emitting element group 71 of the light-emitting element array 7 in the up and down direction of FIG. 3 is made. Thus, the first light shielding member 8 also functions as a spacer which regulates the gap length.

A distance between the convex surface 62 of each of the first lenses 64 and the light-emitting element group 71 corresponding thereto is one of the important conditions (elements) when determining positioning of the condensing point 642 on the light receiving surface 111 in the up and down direction of FIG. 3. Since the distance is certainly regulated by the first light shielding member 8 which also functions as a spacer, the image forming apparatus 1 that is highly precise and highly reliable is obtained.

In addition, a constituent material of the first light shielding member 8 is not specially limited. For example, the same constituent material as the supporting plate 72 may be used.

Furthermore, as shown in FIG. 3, the second light shielding member 8' is provided between the first lens array 6 and the second lens array 6'. The second light shielding member 8' serves to prevent crosstalk between the light components L emitted from the first lenses 64 adjacent to each other.

The second light shielding member 8' is formed by using a block body having a long appearance, in the same manner as the first light shielding member 8 described above. A plurality of through holes 84' which pass through the second light shielding member 8' in the up and down direction (thickness direction) of FIG. 3 are formed in the second light shielding member 8' formed of a block body. Each of the through holes 84' is arranged at the position corresponding to each of the first lenses 64 (second lens 64') and forms an optical path from the first lens 64 to the second lens 64' corresponding thereto. In addition, each of the through holes 84, has a circular shape in plan view and includes thereinside the first lens 64 and the second lens 64' corresponding to the through hole 84'.

In addition, the cross sectional shape of the second light shielding member 8' is a rectangular shape. That is, an upper surface 81' and a lower surface 82' of the second light shielding member 8' are parallel to each other, and side surfaces 83' of the first light shielding member' are also parallel to each other. The upper surface 81' abuts on the lower surface 61' of the second lens array 6', and the lower surface 82' abuts on the upper surface 63 of the first lens array 6. At least one of the upper surface 81' and the lower surface 82' may be fixed by bonding (bonding using adhesive or solvent), for example.

Both ends of the through hole 84' are sealed by the upper surface 63 of the first lens array 6 and the convex surface 62' of the second lens 64'. That is, in the line head 13, a closed space is formed by an inner peripheral surface 841' of each through hole 84', the upper surface 63 of the first lens array 6, and the convex surface 62' of the second lens 64'.

The light L emitted from the first lens 64 is certainly incident on the second lens 64', which partitions the closed spacer through the corresponding closed space (through hole 84'). Thus, the light L emitted from the first lens 64 is incident on only the second lens 64' corresponding to the first lens 64 and is prevented from being incident on the other second lenses 64' adjacent thereto, for example. That is, crosstalk between the light components L emitted from the first lenses 64 adjacent to each other is reliably prevented. As a result, a clear image can be more reliably formed.

In addition, since it is prevented that a foreign matter enters into the closed space, it is prevented that the foreign matter adheres to the lower surface 61 of the first lens array 6. Accordingly, the lower surface 61 of the first lens array 6 is kept clean.

Moreover, similar to the first light shielding member 8 described, in the second light shielding member 8', it is preferable that at least the inner peripheral surface 841' of each through hole 84' has a dark color, such as black, brown, or dark blue. In this way, it is possible to prevent the light L from being reflected from the inner peripheral surface 841' of the through hole 84' when the light L is transmitted through the through hole 84'. Consequently, when the light L is reflected from the inner peripheral surface 841', the reflected light L can be prevented from being incident on the other second lenses 64'. In addition, even if the reflected light L is not incident on the other second lenses 64', it is possible to prevent that the light L is not imaged in a portion of the light receiving surface 111 where an image is to be formed but image blur occurs.

Furthermore, as described above, the second light shielding member 8' is fixed in a state where the upper surface 81' and the lower surface 82' thereof abut on the first lens array 6 and the second lens array 6', respectively. Since the thickness of the second light shielding member 8' is constant, the second light shielding member 8' is used as a spacer that regulates a gap length, which is a distance between the first lens array 6 and the second lens array 6', in the case when the upper surface 63 of the first lens array 6 does not abut on the convex surface 62' of the second lens array. Thus, positioning of the convex surface 62 of each of the first lenses 64 of the first lens array 6 and each convex surface 62' of the second lens array 6' in the up and down direction of FIG. 3 is made. Furthermore, in such a case, a distance between the convex surface 62 of the first lens 64 and the convex surface 62' of the second lens 64' corresponding to the convex surface 62 can be adjusted by appropriately adjusting the thickness of the second light shielding member 8'. As a result, it becomes possible to easily adjust a focal distance of a lens pair configured to include the first lens 64 and the second lens 64' arranged at the position corresponding to the first lens 64.

In addition, a constituent material of the second light shielding member 8' is not specially limited. For example, the same constituent material as the first light shielding member 8 may be used.

As shown in FIGS. 2 and 3r the first lens array 6, the second lens array 6', the light-emitting element array 7, the first light shielding member 8, and the second light shielding member 8' are collectively accommodated in the casing 9. The casing 9 has a frame member (casing body) 91, a lid member (bottom lid) 92 which covers a bottom side of the frame member 91, and a plurality of clamp members 93 which pinch the frame member 91 and the lid member 92 in a collective manner (refer to FIG. 3).

The frame member 91 has a long shape as the entire shape, as shown in FIGS. 2, 5, and 6.

As shown in FIG. 3, the width of the frame member 91 decreases from a lower side toward an upper side of FIG. 3 in a stepwise manner. The frame member 91 has a portion having a largest width and a portion where the width is decreased by one step, and a shoulder portion 916 is formed in a boundary between the portions.

In addition, an inner cavity portion 911 opened to upper and lower sides of the frame member 91 is formed in the frame member 91. The width of the inner cavity portion 911 decreases from the lower side toward the upper side of FIG. 3 in a stepwise manner. That is, the inner cavity portion 911 has a maximum width portion 912 having a maximum width, a minimum width portion 914 which is positioned above the maximum width portion 912 and has a minimum width, and a middle width portion 913 which is positioned between the maximum width portion 912 and the minimum width portion 914.

The first lens array 6, the second lens array 6', the first light shielding member 8, and the second light shielding member 8' are inserted in the minimum width portion 914 and are fixed by adhesive, for example. In this way, the first lens array 6, the second lens array 6', the first light shielding member 8, and the second light shielding member 8' are collectively held on the frame member 91, such that positioning of the first lens array 6, the second lens array 6', the first light shielding member 8, and the second light shielding member 8' in the main scanning direction and the sub-scanning direction is made.

The light-emitting element array 7 is inserted in the maximum width portion 912. In addition, the upper surface 722 of the supporting plate 72 of the light-emitting element array 7 abuts on a boundary portion (stepped portion) 915 between the maximum width portion 912 and the middle width portion 913 and the lower surface 82 of the light shielding member 8.

The lid member 92 supports the light-emitting element array 7 having such a state from the below. The lid member 92 is formed by using a long member having a recessed portion 922, in which the accommodating portion 73 is inserted, at an upper side thereof. A protruding strip 921 that protrudes upward is formed on the edge of the lid member 92. The protruding strip 921 and the boundary portion 915 of the frame member 91 pinch the edge of the lower surface 721 of the supporting plate 72 of the light-emitting element array 7 therebetween in a state where the lid member 92 is accommodated in the maximum width portion 912 of the frame member 91.

Moreover, the lid member 92 is pressed upward by each clamp member 93. In this manner, the lid member 92 is fixed to the frame member 91. In addition, by the pressed lid member 92, positional relationships among the light-emitting element array 7, the first lens array 6, the second lens array 6', the first light shielding member 8, and the second light shielding member 8' in the main scanning direction, the sub-scanning direction, and the up and down direction of FIG. 3 are fixed.

As shown in FIGS. 5 and 6, the plurality of (five in the present embodiment) clamp members 93 are arranged at equal distances in the main scanning direction. Accordingly, the frame member 91 and the lid member 92 can be pinched uniformly in the main scanning direction.

As shown in FIG. 3, each clamp member 93 is obtained by plastically deforming a metal plate such that the entire shape thereof becomes an approximately 'U' shape. Both ends of the clamp member 93 are bent inward and form claws 931. Each claw 931 is engaged with the shoulder portion 916 of the frame member 91.

In addition, a curved portion 932 which is curved upward in the arch shape is formed in the middle portion of the clamp member 93. A top of the curved portion 932 abuts on a lower surface of the lid member 92. In this state, both end sides of the curved portion 932 are pulled upward by each claw 931 engaged with the shoulder portion 916 of the frame member 91. In this way, the curved portion 932 is elastically deformed, such that the lid member 92 is biased upward.

By the clamp member 93 having such a configuration, it is possible to reliably press the lid member 92 against a side of the frame member 91.

In addition, when each clamp member 93 which pinches the frame member 91 and the lid member 92 is detached, the lid member 92 can be detached from the frame member 91. Then, it is possible to perform maintenance, such as replacement and repair, for the light-emitting element array 7.

Furthermore, constituent materials of the frame member 91 and the lid member 92 are not specially limited. For example, the same constituent material as the supporting plate 72 may be used. A constituent material of the clamp member 93 is not specially limited. For example, aluminum or stainless steel may be used. In addition, the clamp member 93 may also be formed of a hard resin material.

Moreover, as shown in FIGS. 5 and 6, the frame member 91 has spacers 94 provided at both ends thereof. Each spacer 94 serves to regulate a distance between the light receiving surface 111 and the first lens array 6 and is configured to include a pin 941, which protrudes toward the photosensitive drum 11, and an abutting portion 942 fixed to an end of the pin 941.

The pin 941 has a columnar shape formed integrally with the frame member 91.

The abutting portion 942 has an abutting surface 943 which abuts on the non-photosensitive region 112 of the photosensitive drum 11. The abutting surface 943 slides on the non-photosensitive region 112 when the photosensitive drum 11 rotates.

A constituent material of the abutting portion 942 is not specially limited. For example, the same constituent material as the supporting plate 72 may be used.

In addition, it is preferable to perform friction reducing processing, for example, to coat fluorine-based resin, such as polytetrafluoroethylene, on the abutting surface 943 of the abutting portion 942. In this manner, it is possible to reduce sliding resistance between the non-photosensitive region 112 and the abutting surface 943 when the photosensitive drum 11 rotates.

A coil spring 95 is provided on a bottom side of each spacer 94. The frame member 91 is biased toward the photosensitive drum 11 by means of each coil spring 95. Accordingly, the abutting surface 943 of the abutting portion 942 is certainly pressed against the non-photosensitive region 112 of the photosensitive drum 11. In addition, it is also possible to prevent that each abutting surface 943 and the non-photosensitive region 112 are momentarily separated from each other when vibration or impact is applied to the image forming apparatus 1, for example.

In the line head 13, a distance between the light receiving surface 111 and the first lens array 6 is regulated by the spacer 94 which abuts on the photosensitive drum 11 and the coil spring 95 which pushes the spacer 94. In this way, positioning of the light receiving surface 111 and the first lens array 6 in the up and down direction of FIG. 5 is made.

Thus, each of the spacer 94 and the coil spring 95 functions as a positioning unit that regulates the distance between the light receiving surface 111 and the first lens array 6.

In addition, the abutting portion 942 is not limited to one which slides on the non-photosensitive region 112 that rotates. For example, the abutting portion 942 may be formed by using a roller that rotates while being in contact with the non-photosensitive region 112.

In addition, as shown in FIGS. 5 and 6, the image forming apparatus 1 has a cleaner 16 serving as a cleaning unit that cleans the upper surface 63' of the second lens array 6'. The cleaner 16 is configured to include a head portion (sliding portion) 161 and a handle (operating portion) 162 which operates the head portion 161. In addition, a middle part of the handle 162 of the cleaner 16 is supported by a supporting portion (not shown) of the image forming apparatus 1 such that the cleaner 16 can move along the longitudinal direction thereof.

As shown in FIG. 7, the outer appearance of the head portion 161 has a block shape, and a lower surface 163 slides with respect to the upper surface 63' of the second lens array 6'.

The width of the head portion 161 is approximately equal to a gap distance between two ribs 917 that are formed on an upper part of the frame member 91 so as to protrude therefrom. In this manner, the entire upper surface 63' of the second lens array 6' can be cleaned only by causing the head portion 161 to reciprocate in the longitudinal direction of FIG. 6. In addition, each of the ribs 917 functions as a guide for the head portion 161 when the head portion 161 is made to reciprocate. Thus, since the movement of the head portion 161 in the width direction thereof is regulated, the head portion 161 is not separated from the upper surface 63' of the second lens array 6'. As a result, the entire upper surface 63' can be certainly cleaned.

Furthermore, as shown in FIG. 3, the upper surface 63' of the second lens array 6' and a surface 918 between the two ribs 917 of the frame member 91 are positioned on approximately the same plane. Accordingly, since a stepped portion is not formed between the upper surface 63' and the surface 918, it is prevented that a foreign matter collects in the stepped portion. In addition, since the width of the head portion 161 can be set to be larger than that of the upper surface 63' of the second lens array 6', the upper surface 63' of the second lens array 6' can be easily and quickly cleaned by reciprocation of the head portion 161.

The head portion 161 is formed of a fibrous porous material, for example. Fibrous porous materials include a textile fabric, a nonwoven fabric, papers, and a group of staple fibers, for example. Here, the textile fabric includes a woven fabric, a knitted fabric, and a fabric similar to those described above. In the case where a nonwoven fabric is used, the packing density (volume density) of fibers is not specially limited. As papers, common paper (foreign paper or Japanese paper) or various kinds of artificial paper may be used.

The handle 162 has a rod shape. The head portion 161 is provided at an end of the handle 162. A constituent material of the handle 162 is not specially limited. For example, the same constituent material as the supporting plate 72 may be used.

A middle part of the handle 162 of the cleaner 16 having such a configuration is supported by a supporting portion (not shown) of the image forming apparatus 1 such that the cleaner 16 can move along the longitudinal direction thereof. In a state (state shown in FIG. 6) where the cleaner 16 is used, the lower surface 163 of the head portion 161 abuts on the upper surface 63' of the second lens array 6'. In addition, in a state (state shown in FIG. 5) where the cleaner 16 is not used, the head portion 161 retreats from the upper surface 63' of the second lens array 6'.

As described above, in the cleaner 16, the handle 162 can be moved along the longitudinal direction thereof in the state shown in FIG. 6. In this way, the head portion 161 slides on the upper surface 63' of the second lens array 6'. Accordingly, for example, when the upper surface 63' of the second lens array 6' is dirty, the dirt on the upper surface 63' can be easily and certainly wiped away. That is, the upper surface 63' can be easily and certainly cleaned.

In addition, as described above, the upper surface 63' of the second lens array 6' is a flat surface. For this reason, foreign matters, such as dust or dirt, do not easily collect on the upper surface 63'. Thus, the upper surface 63' of the second lens array 6' can be maintained in a clean state. In addition, as described above, even if foreign matters collect on the upper surface 63', the foreign matters can be easily and certainly removed by the cleaner 16.

Alternatively, it may be possible to impregnate the head portion 161 with a liquid material, such as a volatile solvent (for example, alcohol) or various kinds of oil. By performing cleaning (wet cleaning) using the head portion 161 impregnated with a liquid material, foreign matters can be more easily and certainly removed. In this case, a supply unit (not shown) that supplies the liquid material to the head portion 161 is provided in the image forming apparatus 1.

Antifouling processing may be performed on the upper surface 63' of the second lens array 6'. Processing for preventing or suppressing adhesion of dirt onto the upper surface 63' and processing for easily removing dirt even if the dirt adheres to the upper surface 63' may be mentioned as the antifouling processing. As such antifouling processing, for example, a method of applying a fluorine-containing silane compound onto the upper surface 63' using a dipping method, for example, may be mentioned (for example, refer to JP-A-2005-3817).

In addition, processing for scratch resistance may also be performed on the upper surface 63' of the second lens array 6'. As the processing for scratch resistance, for example, a method of forming a layer, which contains $C_6H_{14}$ and $C_2F_6$ as main materials, on the upper surface 63 by using a vapor deposition method, such as a high-frequency plasma CVD method, may be used (for example, refer to JP-A-2006-133420).

Moreover, when the antifouling processing or the processing for scratch resistance is performed on the upper surface 63' of the second lens array 6', the operation can be easily performed because the upper surface 63' is a flat surface. In addition, since the upper surface 63' is a flat surface, a layer formed by the antifouling processing or the processing for scratch resistance can be uniformly formed on the upper surface 63'.

In addition, the cleaning unit is not limited to using a method of performing cleaning with the cleaner 16 having the configuration shown in the drawing. For example, a method of performing the cleaning by causing a roller, which has an adhesive surface as an outer peripheral surface, to roll on the upper surface 63' may be used, or a method of performing the cleaning by spraying air onto the upper surface 63' may be used.

Next, an operation of the line head 13, that is, an example of light-emitting timing of each light-emitting element 74 will be described with reference to FIGS. 9 to 14. Since operations of the respective light-emitting element group columns are equal, an operation of the light-emitting element group column (light-emitting element groups 71a to 71c) located at the first column will be hereinafter described as a representative example. In addition, as described above, numbers of 1 to 8 are given to the eight light-emitting elements 74 belonging to the light-emitting element group 71a, respectively. Similarly, numbers of 9 to 16 are given to the eight light-emitting elements 74 belonging to the light-emitting element group 71b, respectively. Similarly, numbers of 17 to 24 are given to the eight light-emitting elements 74 belonging to the light-emitting element group 71c, respectively. Moreover, in the following description, each number given to the light-emitting element 74 corresponds to each number given to a spot (latent image) Q.

When the line head 13 operates, the photosensitive drum 11 rotates at a predetermined constant speed.

First, as shown in FIG. 9, the light-emitting elements 74 corresponding to Nos. 1, 3, 5, and 7 emit light. Then, each of the light-emitting elements 74 is instantaneously switched off. In addition, four spots Q (condensing points 642) corresponding to the light-emitting elements 74 are formed on the light receiving surface 111 of the photosensitive drum 11 by emission of the light-emitting elements 74. Each spot Q has a very small area.

The four spots Q are formed at the positions determined by inverting the light-emitting elements 74 corresponding to Nos. 1, 3, 5, and 7 with respect to the first lens 64a and the second lens 64'a, respectively.

In other words, the spot Q with No. 1 corresponding to the light-emitting element 74 with No. 1 located at a rightmost side in FIG. 9 is positioned at a leftmost side in FIG. 9. The spot Q with No. 3 is positioned at a right side of the spot Q with No. 1 in the main scanning direction so as to be adjacent to the spot Q with No. 1 with a gap therebetween. The spot Q with No. 5 is positioned at a right side of the spot Q with No. 3 in the main scanning direction so as to be adjacent to the spot Q with No. 3 with a gap therebetween. The spot Q with No. 7 is positioned at a right side of the spot Q with No. 5 in the main scanning direction so as to be adjacent to the spot Q with No. 5 with a gap therebetween.

Figure 10:
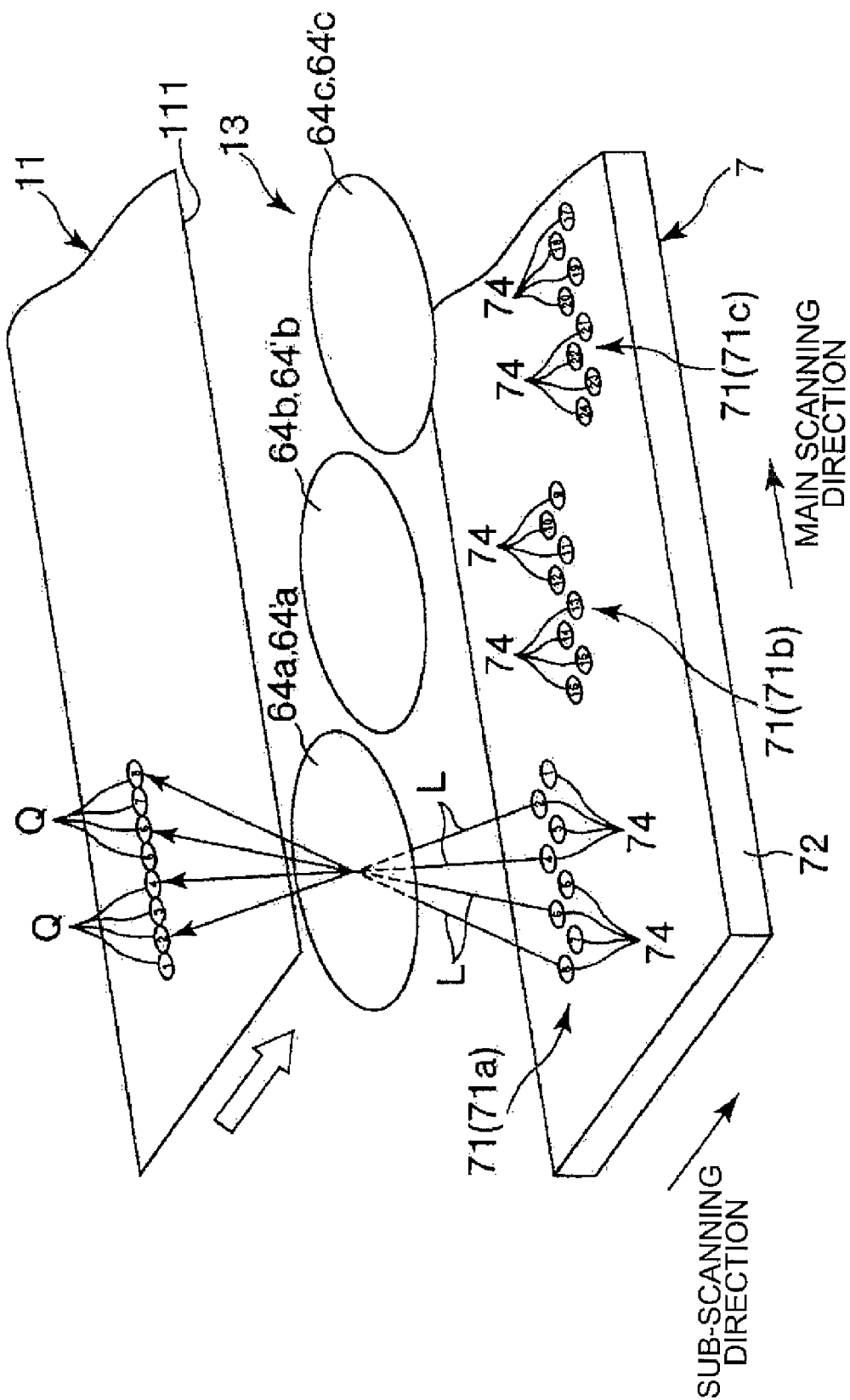
FIG. 10 is a perspective view schematically illustrating an operation state over time in the line head shown in FIG. 2.

Then, the light-emitting elements 74 corresponding to Nos. 2, 4, 6, and 8 emit light in synchronization (conjunction) with rotation of the photosensitive drum 11 (refer to FIG. 10). Then, each of the light-emitting elements 74 is instantaneously switched off. In addition, four spots Q corresponding to the light-emitting elements 74 are formed on the light receiving surface 111 of the photosensitive drum 11 by emission of the light-emitting elements 74.

Since the photosensitive drum 11 rotates, the four spots Q are formed between the spots Q corresponding to Nos. 2, 4, 6, and 8, respectively. Thus, the spots Q corresponding to Nos. 1 to 8 are arranged in a straight line shape along the main scanning direction sequentially from the left in FIG. 10.

Figure 11:
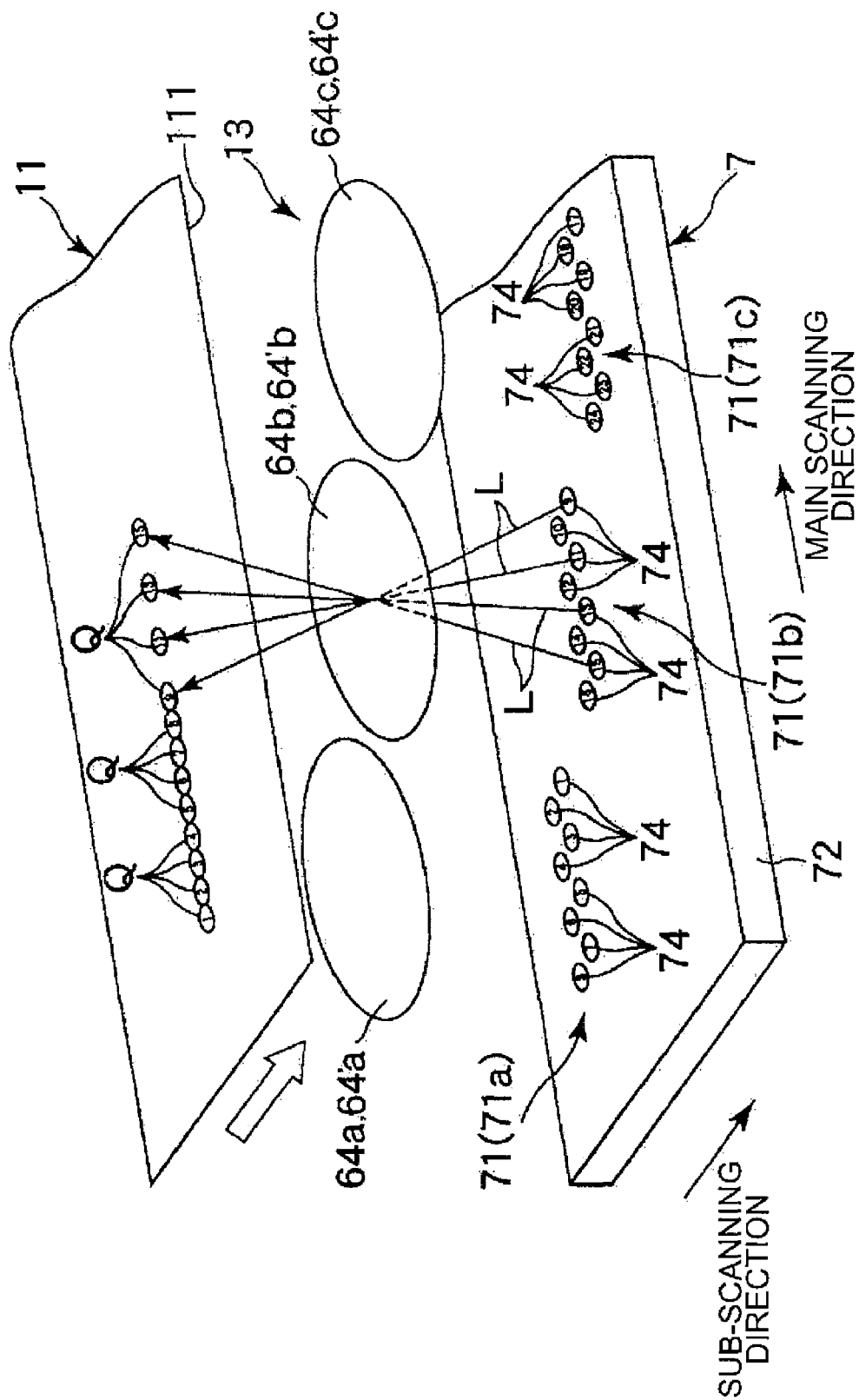
FIG. 11 is a perspective view schematically illustrating an operation state over time in the line head shown in FIG. 2.

Then, the light-emitting elements 74 corresponding to Nos. 9, 11, 13, and 15 emit light in synchronization with rotation of the photosensitive drum 11 (refer to FIG. 11). Then, each of the light-emitting elements 74 is instantaneously switched off. In addition, four spots Q corresponding to the light-emitting elements 74 are formed on the light receiving surface 111 of the photosensitive drum 11 by emission of the light-emitting elements 74.

These four spots Q are formed at a right side of the spot Q corresponding to No. 8 in the main scanning direction. The spot Q corresponding to No. 9 is positioned near the right side of the spot Q corresponding to No. 8 in the main scanning direction so as to be adjacent to the spot Q corresponding to No. 8. The spot Q with No. 11 is positioned at a right side of the spot Q with No. 9 in the main scanning direction so as to be adjacent to the spot Q with No. 9 with a gap therebetween. The spot Q with No. 13 is positioned at a right side of the spot Q with No. 11 in the main scanning direction so as to be adjacent to the spot Q with No. 11 with a gap therebetween. The spot Q with No. 15 is positioned at a right side of the spot Q with No. 13 in the main scanning direction so as to be adjacent to the spot Q with No. 13 with a gap therebetween.

Figure 12:
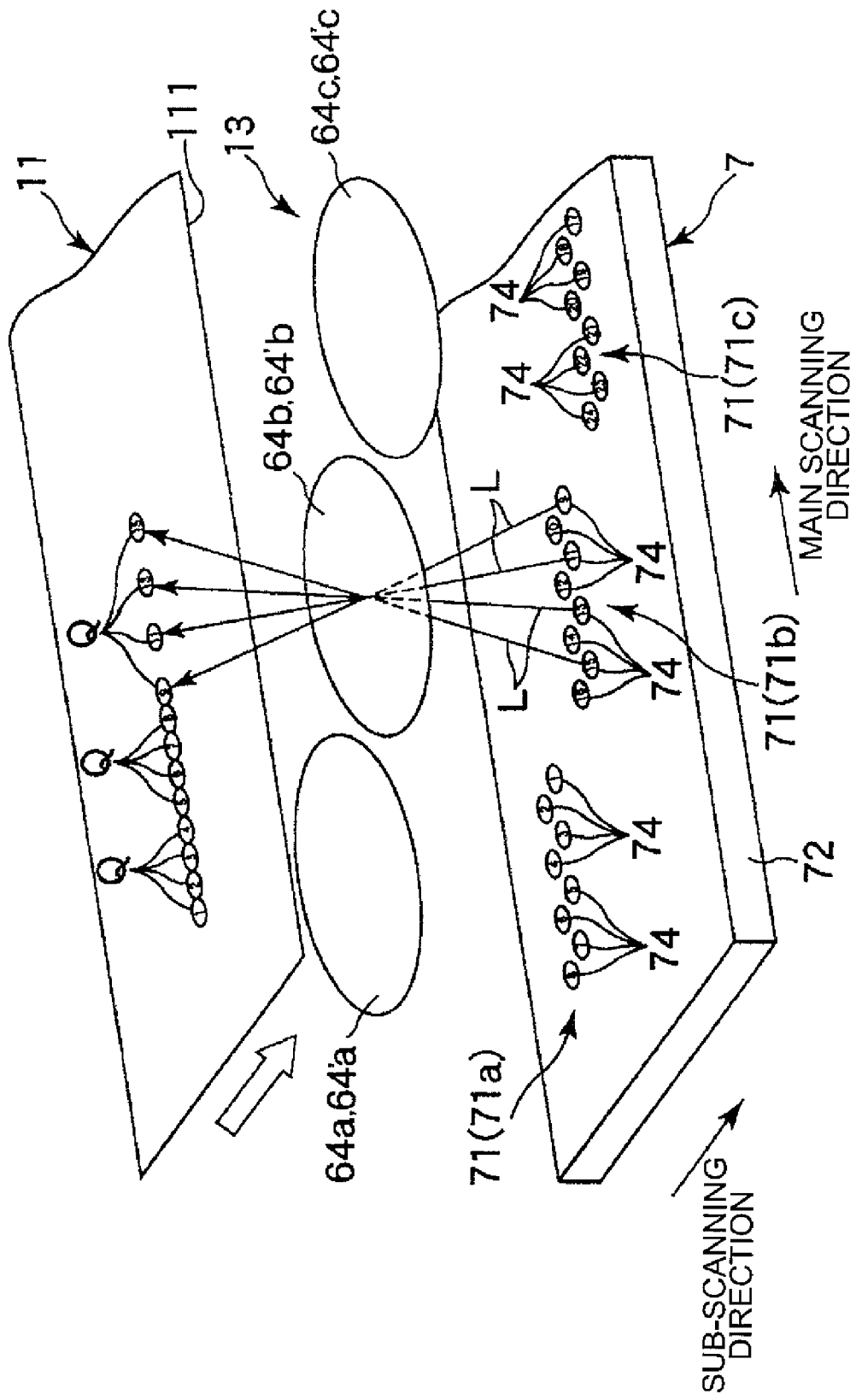
FIG. 12 is a perspective view schematically illustrating an operation state over time in the line head shown in FIG. 2.

Then, in the same manner as described above, the light-emitting elements 74 corresponding to Nos. 10, 12, 14, and 16 emit light (refer to FIG. 12). Then, each of the light-emitting elements 74 is instantaneously switched off. In addition, four spots Q corresponding to the light-emitting elements 74 are formed on the light receiving surface 111 of the photosensitive drum 11 by emission of the light-emitting elements 74. Thus, the spots Q corresponding to Nos. 1 to 16 are arranged in a straight line shape along the main scanning direction sequentially from the left in FIG. 12.

Figure 13:
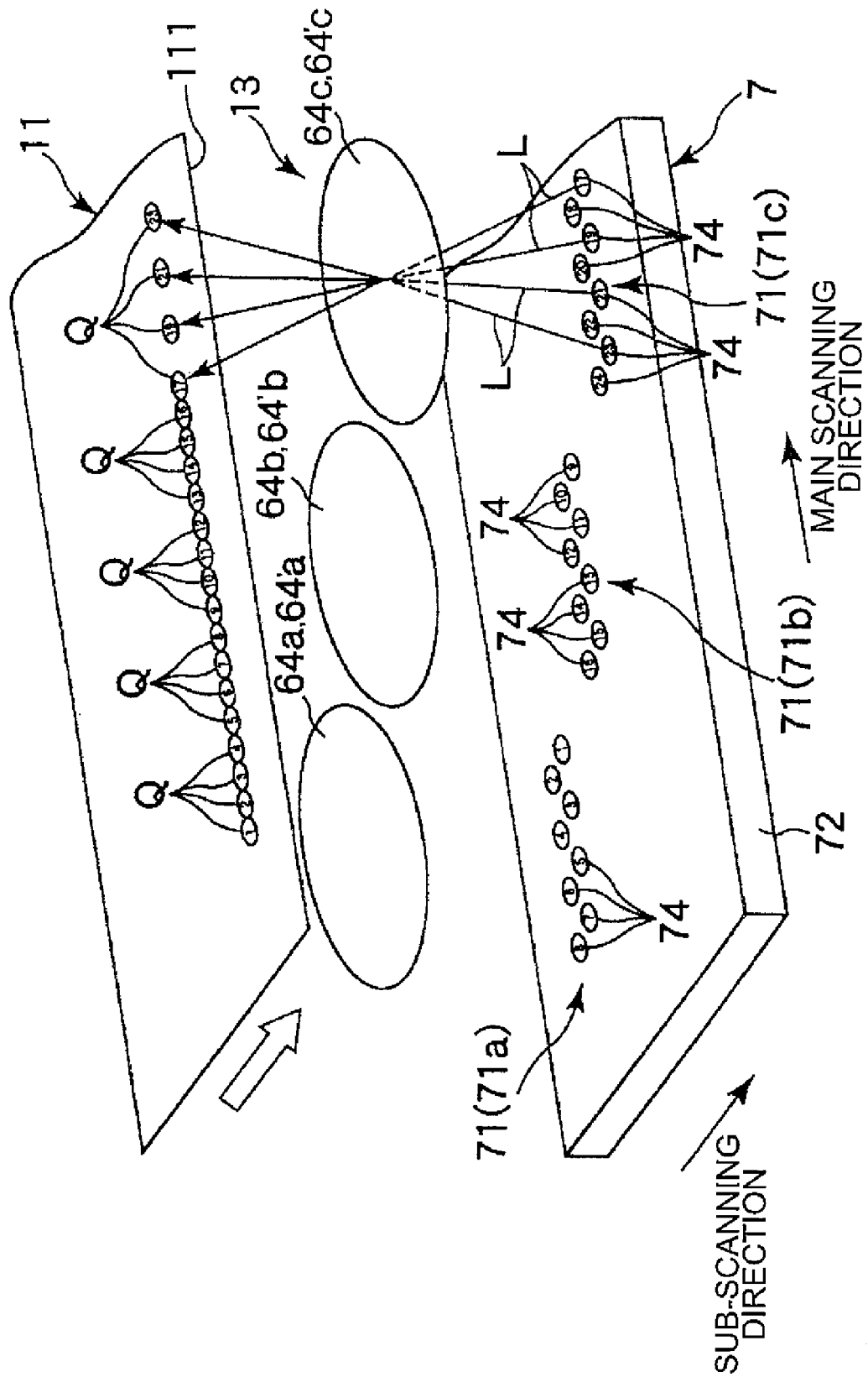
FIG. 13 is a perspective view schematically illustrating an operation state over time in the line head shown in FIG. 2.

Then, in the same manner as described above, the light-emitting elements 74 corresponding to Nos. 17, 19, 21, and 23 emit light (refer to FIG. 13). Then, each of the light-emitting elements 74 is instantaneously switched off. In addition, four spots Q corresponding to the light-emitting elements 74 are formed on the light receiving surface 111 of the photosensitive drum 11 by emission of the light-emitting elements 74.

The spot Q corresponding to No. 17 is positioned near the right side of the spot Q corresponding to No. 16 in the main scanning direction so as to be adjacent to the spot Q corresponding to No. 16. The spot Q with No. 19 is positioned at a right side of the spot Q with No. 17 in the main scanning direction so as to be adjacent to the spot Q with No. 17 with a gap therebetween. The spot Q with No. 21 is positioned at a right side of the spot Q with No. 19 in the main scanning direction so as to be adjacent to the spot Q with No. 19 with a gap therebetween. The spot Q with No. 23 is positioned at a right side of the spot Q with No. 21 in the main scanning direction so as to be adjacent to the spot Q with No. 21 with a gap therebetween.

Figure 14:
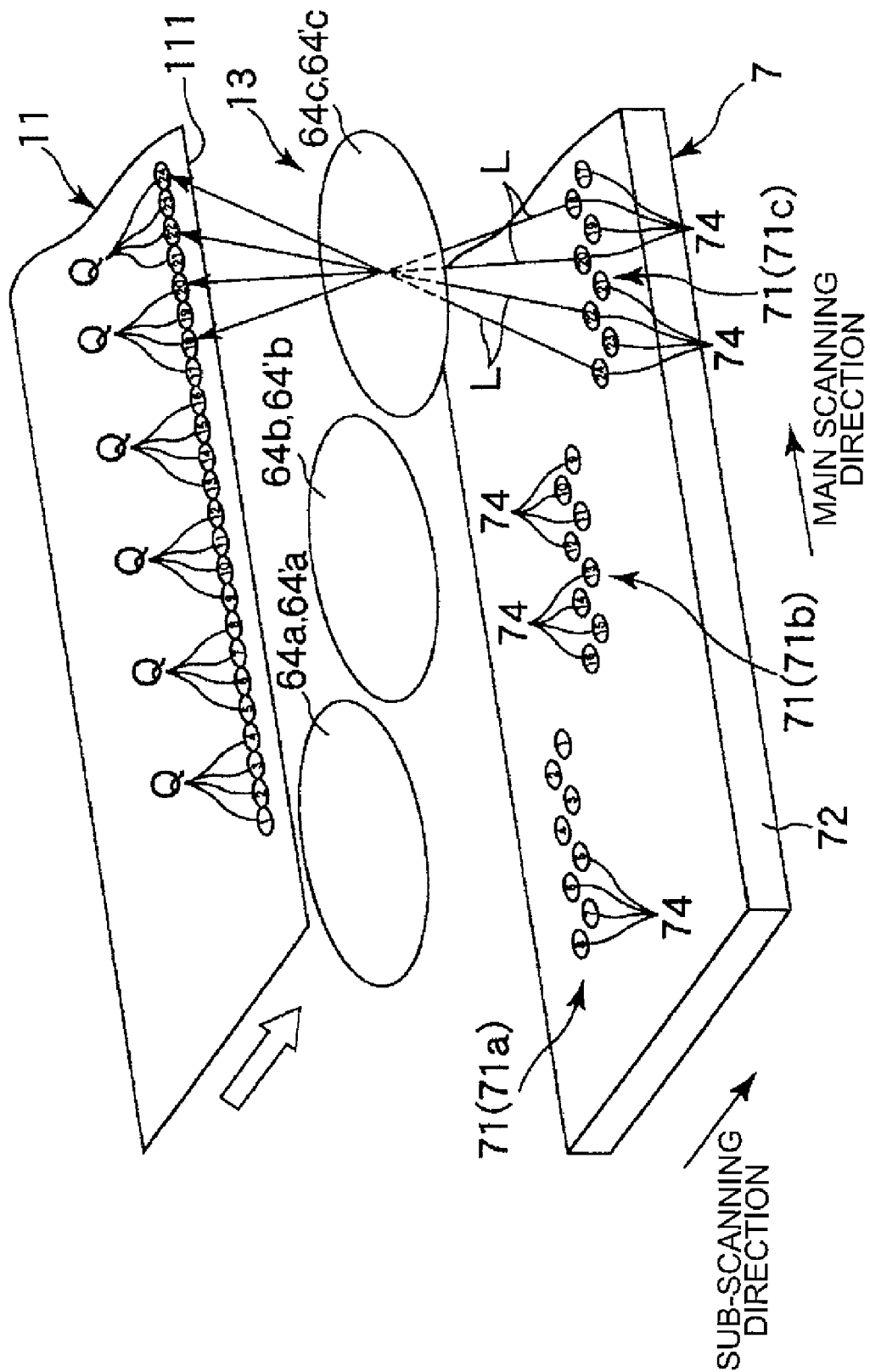
FIG. 14 is a perspective view schematically illustrating an operation state over time in the line head shown in FIG. 2.

Then, in the same manner as described above, the light-emitting elements 74 corresponding to Nos. 18, 20, 22, and 24 emit light (refer to FIG. 14). Then, each of the light-emitting elements 74 is instantaneously switched off. In addition, four spots Q corresponding to the light-emitting elements 74 are formed on the light receiving surface 111 of the photosensitive drum 11 by emission of the light-emitting elements 74. Thus, the spots Q corresponding to Nos. 1 to 24 are arranged in a straight line shape along the main scanning direction sequentially from the left in FIG. 14.

Thus, in the line head 13, the light-emitting elements 74 located at two light-emitting element rows belonging to one light-emitting element group 71 are operated in a condition where light-emitting timing shifts, and the light-emitting element groups 71 located at one light-emitting element group column are operated in a condition where light-emitting timing shifts.

Furthermore, as described above, the plurality of light-emitting element groups 71 are arranged in high density. Even in one light-emitting element group 71, the plurality of light-emitting elements 74 belonging thereto are arranged in high density.

In addition, as described above, the upper surface 63' of the second lens array 6' is kept clean.

In the line head 13, the plurality of fine spots Q can be formed on the light receiving surface 111 in high density due to synergistic effects of those requirements. As a result, it is possible to obtain a clearer image and to obtain the image forming apparatus 1 having high precision, reliability, and durability.

Next, a line head according to a second embodiment of the invention will be described. In the following description, an explanation will be made focusing on a portion different from the first embodiment described above, and an explanation of the same portion will be omitted.

Figure 15:
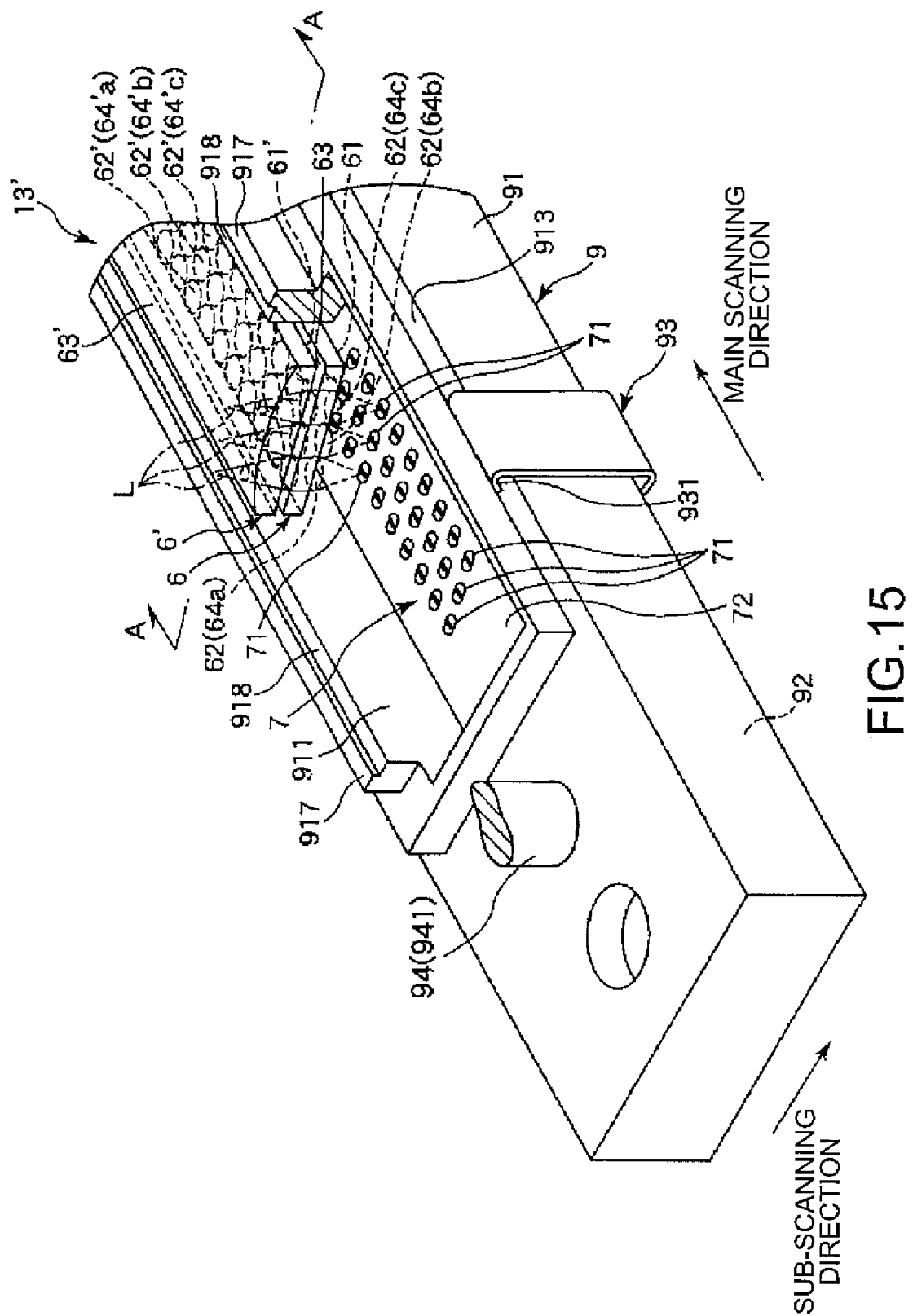
FIG. 15 is a partially sectional perspective view illustrating a second embodiment of the line head included in the image forming apparatus shown in FIG. 1.
Figure 16:
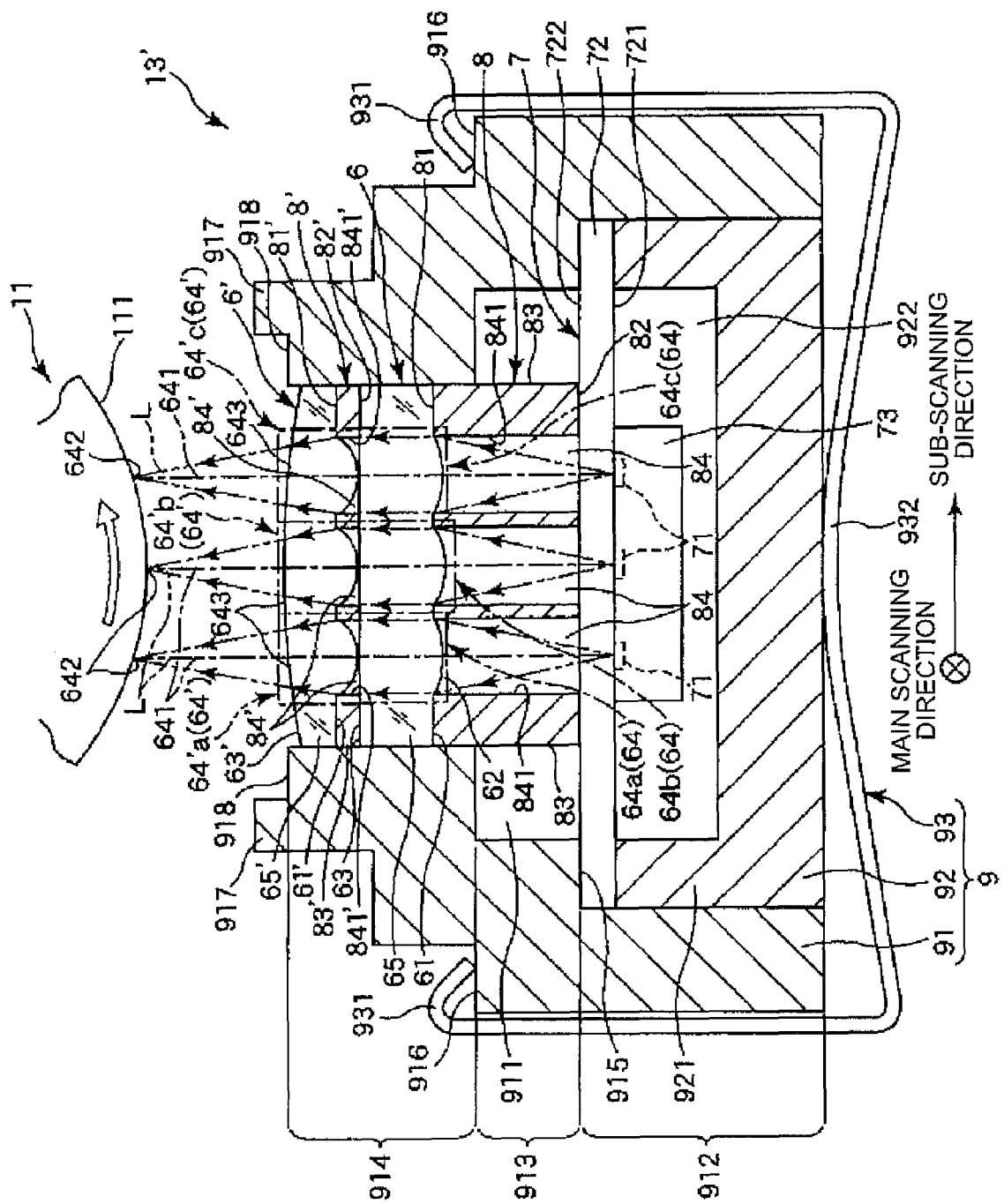
FIG. 16 is a cross-sectional view taken along the line XVI-XVI of FIG. 15.

FIG. 15 is a partially sectional perspective view illustrating the second embodiment of the line head included in the image forming apparatus shown in FIG. 1, and FIG. 16 is a cross-sectional view taken along the line XVI-XVI of FIG. 15.

As shown in FIGS. 15 and 16, a line head 13' according to the present embodiment is different from that according to the first embodiment in that the upper surface (emission surface) 63' of the second lens array 6' is a protruding surface protruding such that a middle portion in the width direction thereof is higher than an edge.

That is, in the present embodiment, a convex surface formed on the lower surface 61' is not formed on the upper surface (emission surface) 63' of the second lens array 6', and a cross section of the second lens array 6' in the width direction thereof has a shape curved in a convex shape. That is, the second lens array 6' forms a large lens as a whole.

In the case where such a configuration is adopted, the aberration correction capability of the entire optical system can be improved by increasing optical degree of freedom, such as changing an angle of a laser beam, with respect to only a lens row (second lens 64'a and second lens 64'c) located at the outer side in a sub-operation direction of the second lens array 6'.

Next, a line head according to a third embodiment of the invention will be described. In the following description, an explanation will be made focusing on a portion different from the first embodiment described above, and an explanation of the same portion will be omitted.

Figure 17:
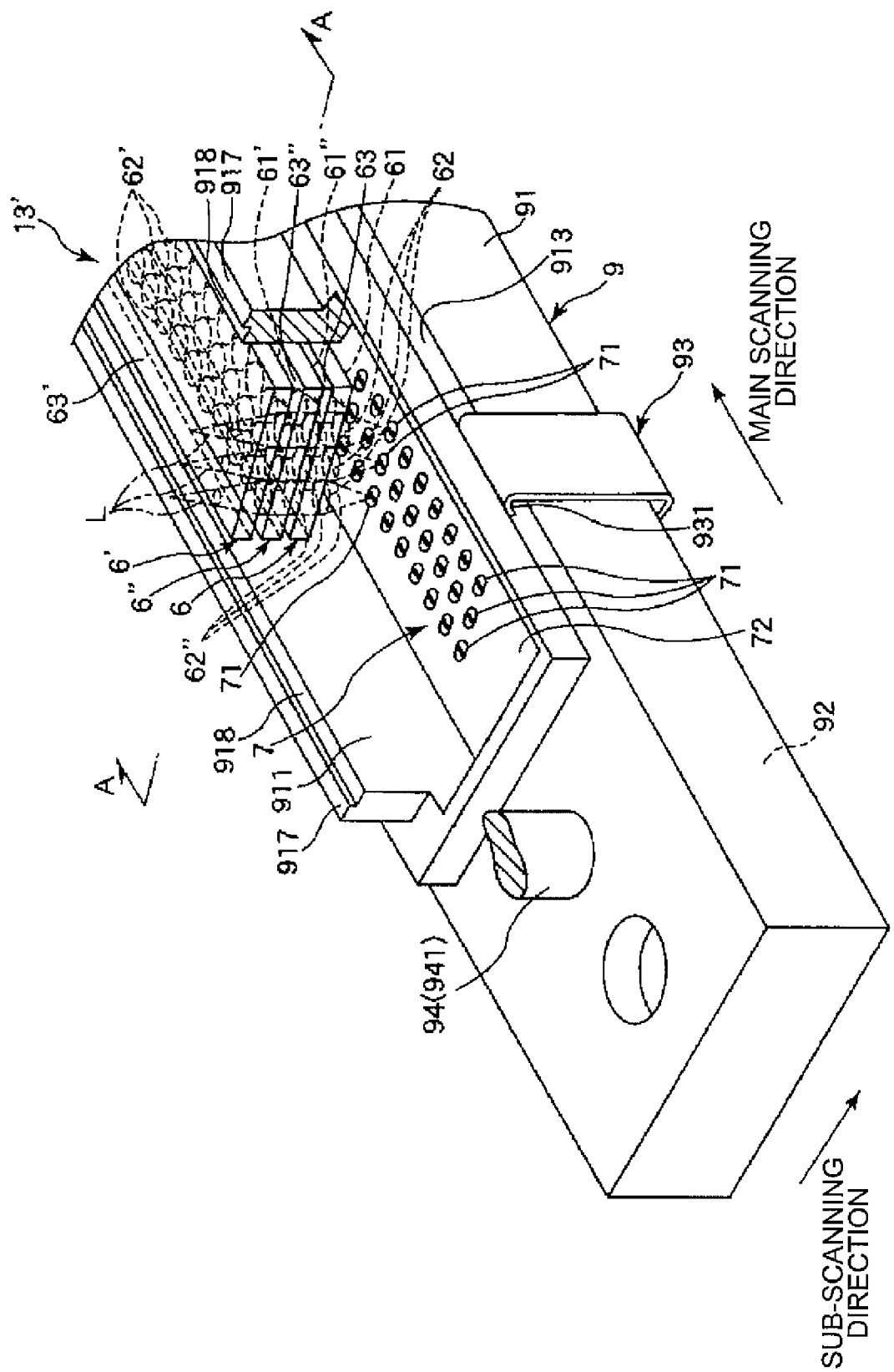
FIG. 17 is a partially sectional perspective view illustrating a third embodiment of the line head included in the image forming apparatus shown in FIG. 1.
Figure 18:
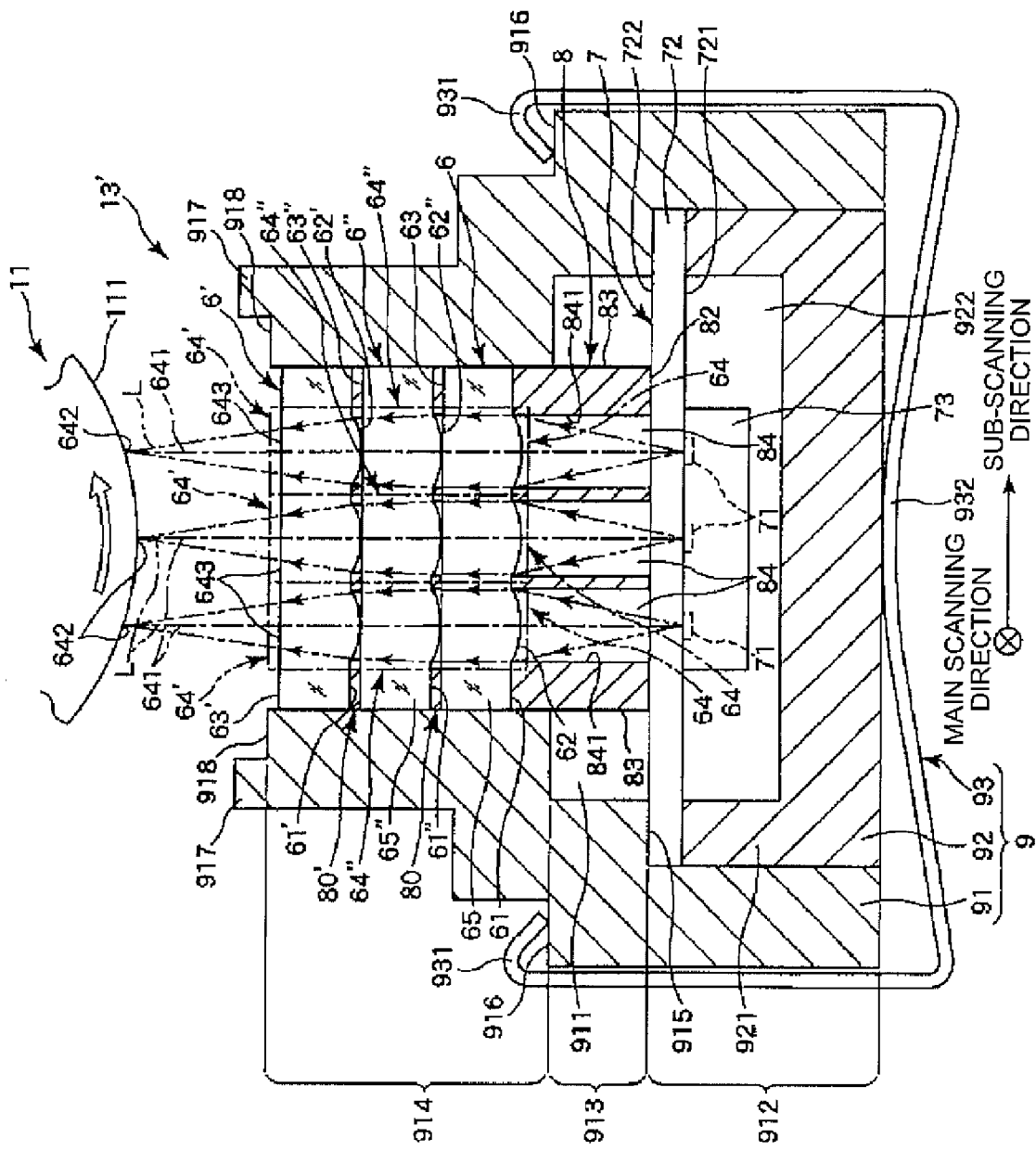
FIG. 18 is a cross-sectional view taken along the line XVIII-XVIII of FIG. 17.

FIG. 17 is a partially sectional perspective view illustrating the third embodiment of the line head included in the image forming apparatus shown in FIG. 1, and FIG. 18 is a cross-sectional view taken along the line XVIII-XVIII of FIG. 17. Moreover, in FIGS. 17 and 18, some of the reference numerals corresponding to the same portions as those shown in FIGS. 2 and 3 are omitted.

As shown in FIGS. 17 and 18, the line head 13' according to the present embodiment is different from that according to the first embodiment in that a third lens array 6" is provided between the first lens array 6 and the second lens array 6' but is the same as that according to the first embodiment in other points.

As shown in FIGS. 17 and 18, the third lens array 6" is formed by using a plate-shaped body having a long appearance.

The third lens array 6" is arranged at a light-emitting surface side of the first lens array 6 described above so as to be opposite to the first lens array 6 with a second light shielding member 80 interposed therebetween.

In addition, the third lens array 6" is arranged at a light-incidence surface side of the second lens array 6' described above so as to be opposite to the second lens array 6' with a third light shielding member 80' interposed therebetween.

As shown in FIG. 18, a plurality of spherical surfaces, that is, convex surfaces 62" are formed on a lower surface (incidence surface) 61", of the third lens array 6" on which the light L is incident. That is, the convex surface 62" is formed so as to be opposite to the upper surface 63 of the first lens array 6 described above. In addition, a convex surface, formed on the lower surface 61" is not formed but a flat surface is formed as an upper surface (emission surface) 63" of the third lens array 6" from which the light L is emitted. The light L which has been transmitted through the first lens array 6 described above is incident on each convex surface 62", emitted from the upper surface 63", and is then incident on the second lens array 6'. In the third lens array 6", a portion surrounded by a dashed-dotted line in FIG. 18 is a third lens 64" which functions as an optical path. Moreover, in the present embodiment, a portion (mainly, a portion around the third lens 64") of the third lens array 6" excluding the third lens 64", that is, a portion of the third lens array 6" not functioning as an optical path is referred to as a third lens support portion 65". In addition, the third lens 64" and the third lens support portion 65" may be formed by using the same materials as the first lens 64 and the first lens support portion 65 described above, and accordingly, an explanation thereof will be omitted.

The plurality of third lenses 64" are arranged at the positions corresponding to the plurality of first lenses 64 in the first lens array 6 and the plurality of second lenses 64' in the second lens array 6'.

The third lens 64" is a plano-convex lens having a convex surface 62" as a surface on a side of incidence of the light L and a flat surface as a surface on a side of emission of the light L. In addition, as described above, the upper surface 63" of the third lens array 6" is a flat surface.

In addition, the plurality of third lenses 64" are arranged in the same manner as the first lenses 64 and the second lenses 64'.

In addition, each of the second light shielding member 80 and the third light shielding member 80' has the same structure as the second light shielding member 8' in the first embodiment described above.

By configuring the line head 13' as described above, the aberration correction capability of the entire optical system can be improved.

Moreover, even though the line head 13, has three lens arrays in the above embodiment, the line head 13' may have four or more lens arrays.

Next, a line head according to a fourth embodiment of the invention will be described. In the following description, an explanation will be made focusing on a portion different from the first embodiment described above, and an explanation of the same portion will be omitted.

Figure 19:
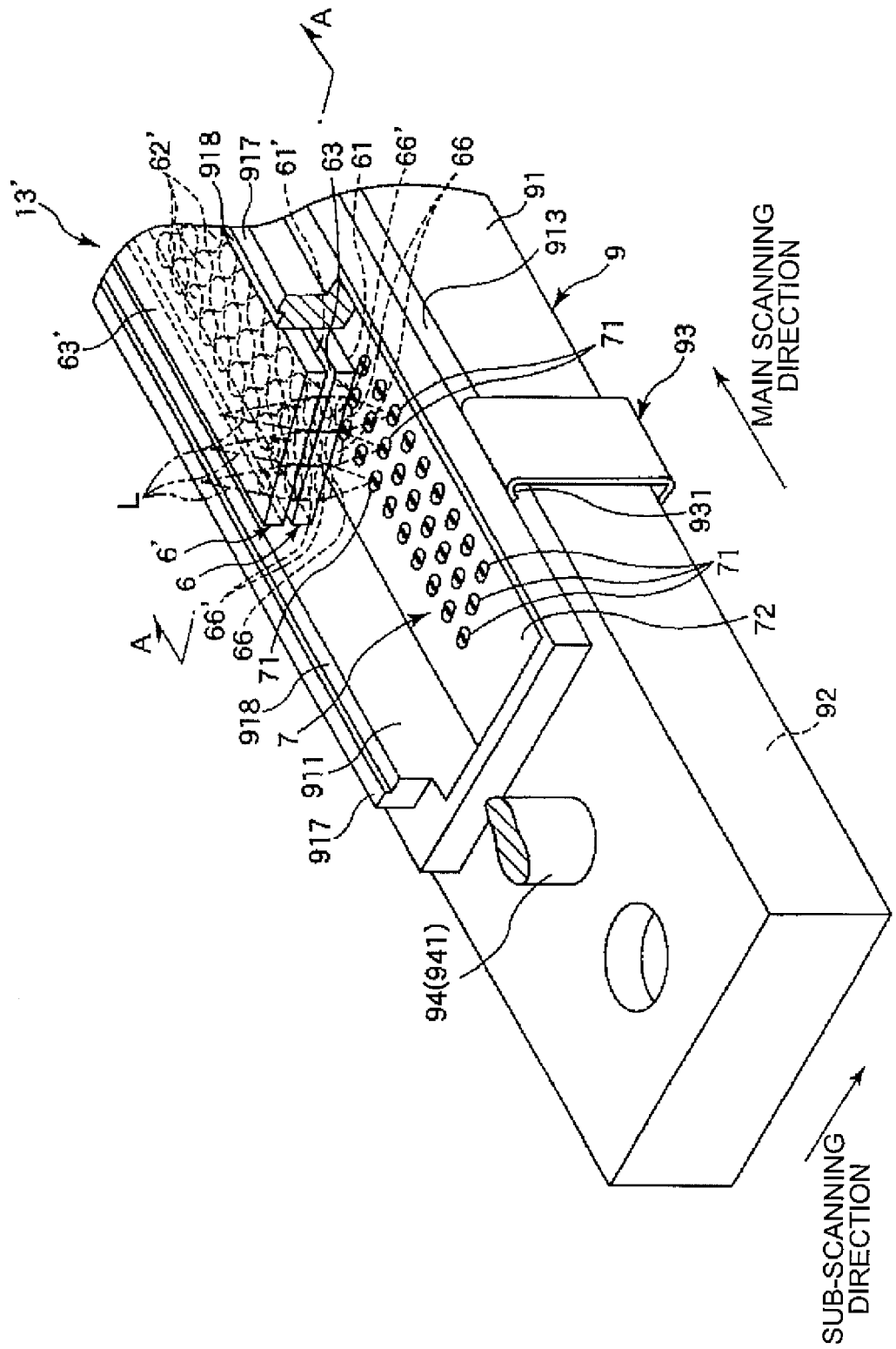
FIG. 19 is a partially sectional perspective view illustrating a fourth embodiment of the line head included in the image forming apparatus shown in FIG. 1.
Figure 20:
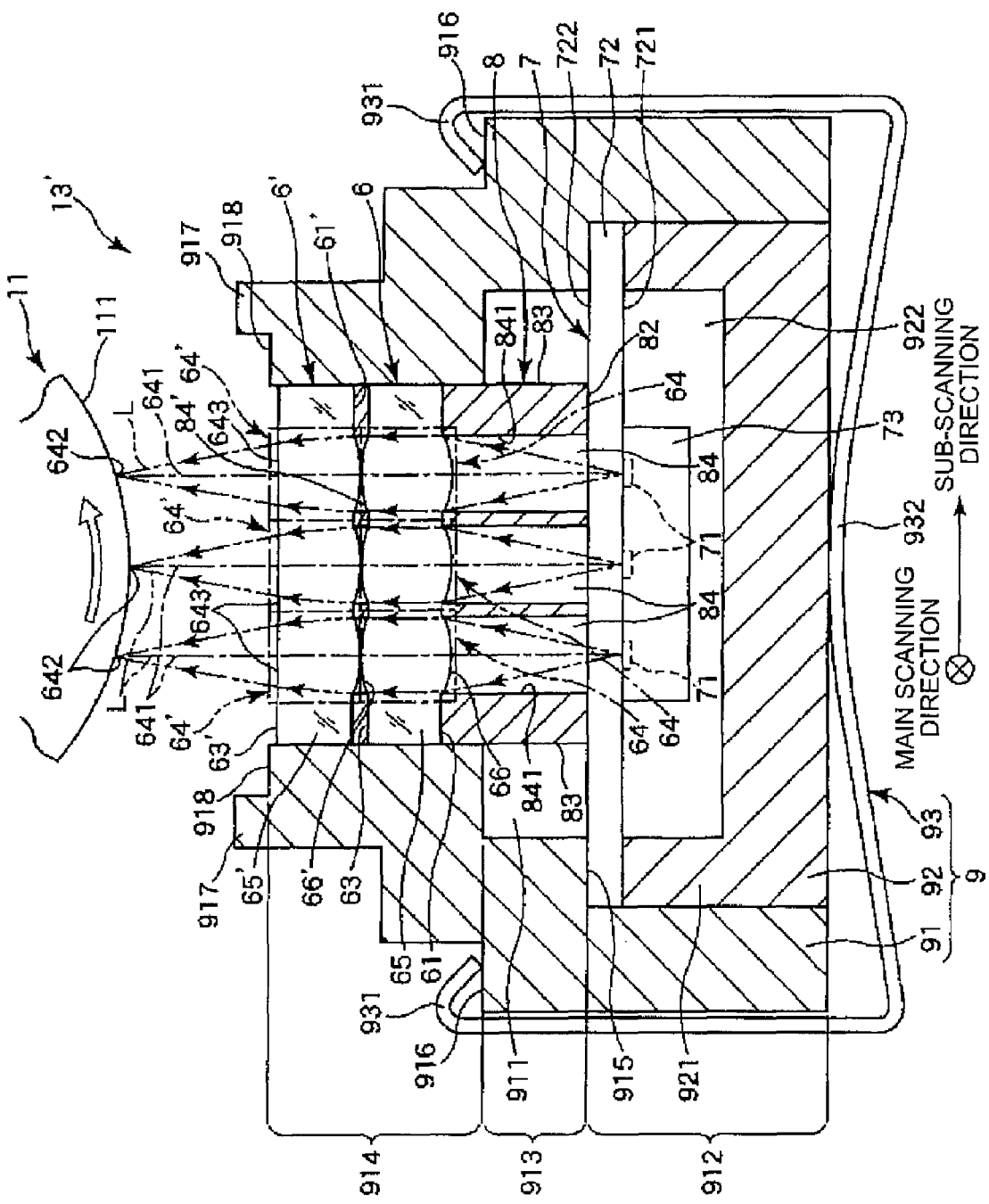
FIG. 20 is a cross-sectional view taken along the line XX-XX of FIG. 19.

FIG. 19 is a partially sectional perspective view illustrating the fourth embodiment of the line head included in the image forming apparatus shown in FIG. 1, and FIG. 20 is a cross-sectional view taken along the line XX-XX of FIG. 19. Moreover, in FIGS. 19 and 20, some of the reference numerals corresponding to the same portions as those shown in FIGS. 2 and 3 are omitted.

As shown in FIGS. 19 and 20, the line head 13' according to the present embodiment is different from that according to the first embodiment in that the first lens array 6 has convex surfaces as both surfaces of the lower surface (incidence surface) 61, on which the light L is incident, and the upper surface (emission surface) 63, from which the light L is emitted, but is the same as that according to the first embodiment in other points.

As shown in FIGS. 19 and 20, a plurality of spherical surfaces, that is, first convex surfaces 66 are formed on the lower surface (incidence surface) 61 of the first lens array 6 on which the light L is incident. In addition, a second convex surface 66' is formed on the upper surface (emission surface) 63 of the first lens array 6 from which the light L is emitted. When the light L is irradiated from the light-emitting element array 7, the light L is incident on each of the first convex surfaces 66, is then emitted from each of the second convex surfaces 66', and is then incident on the second lens array 6'. In the first lens array 6, a portion surrounded by a dashed-dotted line in FIG. 20 is a first lens 64 which functions as an optical path. Moreover, in the present embodiment, a portion (mainly, a portion around the first lens 64) of the first lens array 6 excluding the first lens 64, that is, a portion of the first lens array 6 not functioning as an optical path is referred to as a first lens support portion 65.

The first lens 64 is a plano-convex lens having the first convex surface 66 as a surface on a side of incidence of the light L and the second convex surfaces 66' as a surface on a side of emission of the light L.

By making the first lens array 6 have the configuration described above, the number of optical surfaces (convex surfaces) is increased, and accordingly, the aberration correction capability of the entire optical system can be improved.

Next, a line head according to a fifth embodiment of the invention will be described. In the following description, an explanation will be made focusing on a portion different from the first embodiment described above, and an explanation of the same portion will be omitted.

Figure 21:
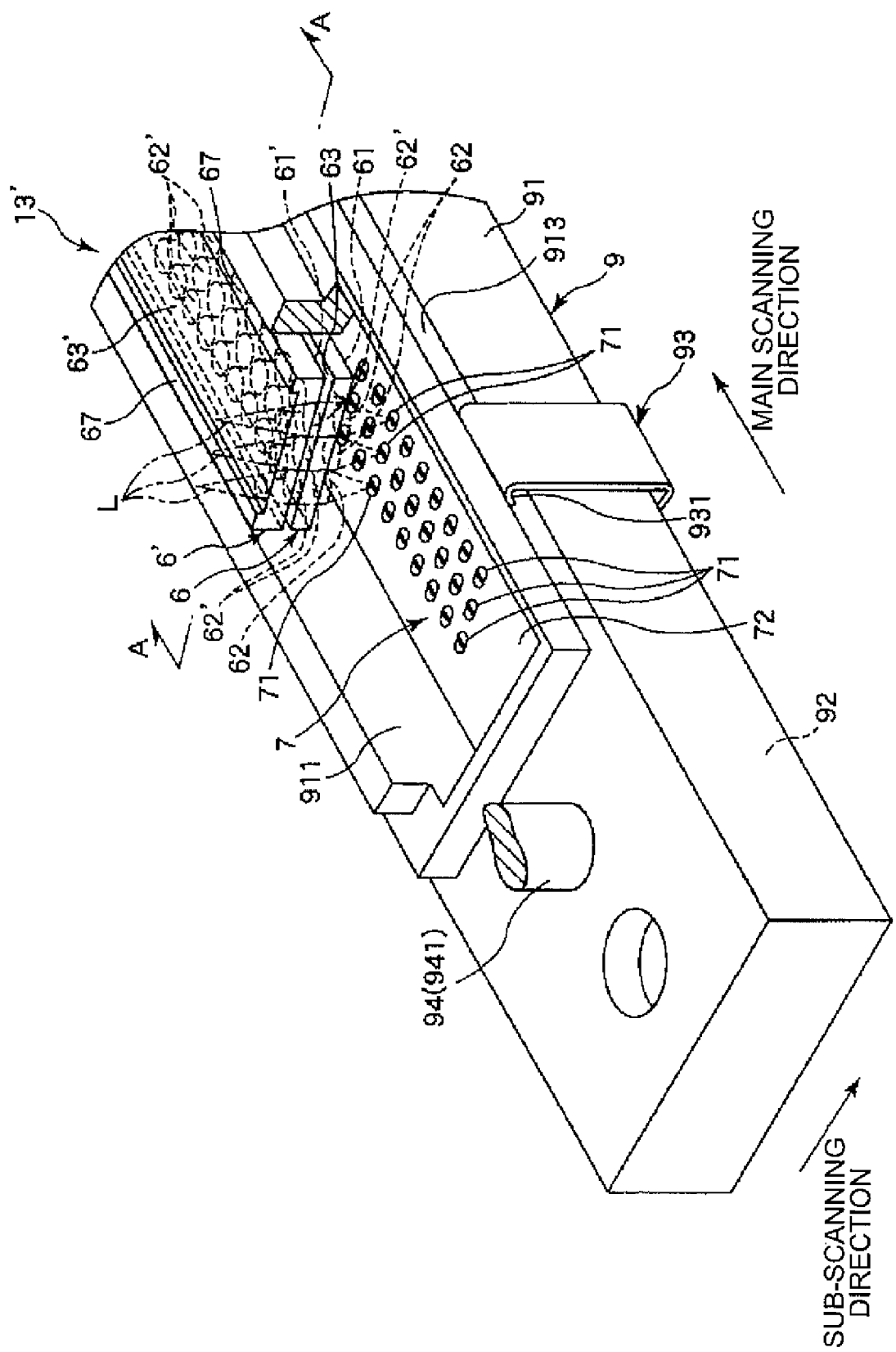
FIG. 21 is a partially sectional perspective view illustrating a fifth embodiment of the line head included in the image forming apparatus shown in FIG. 1.
Figure 22:
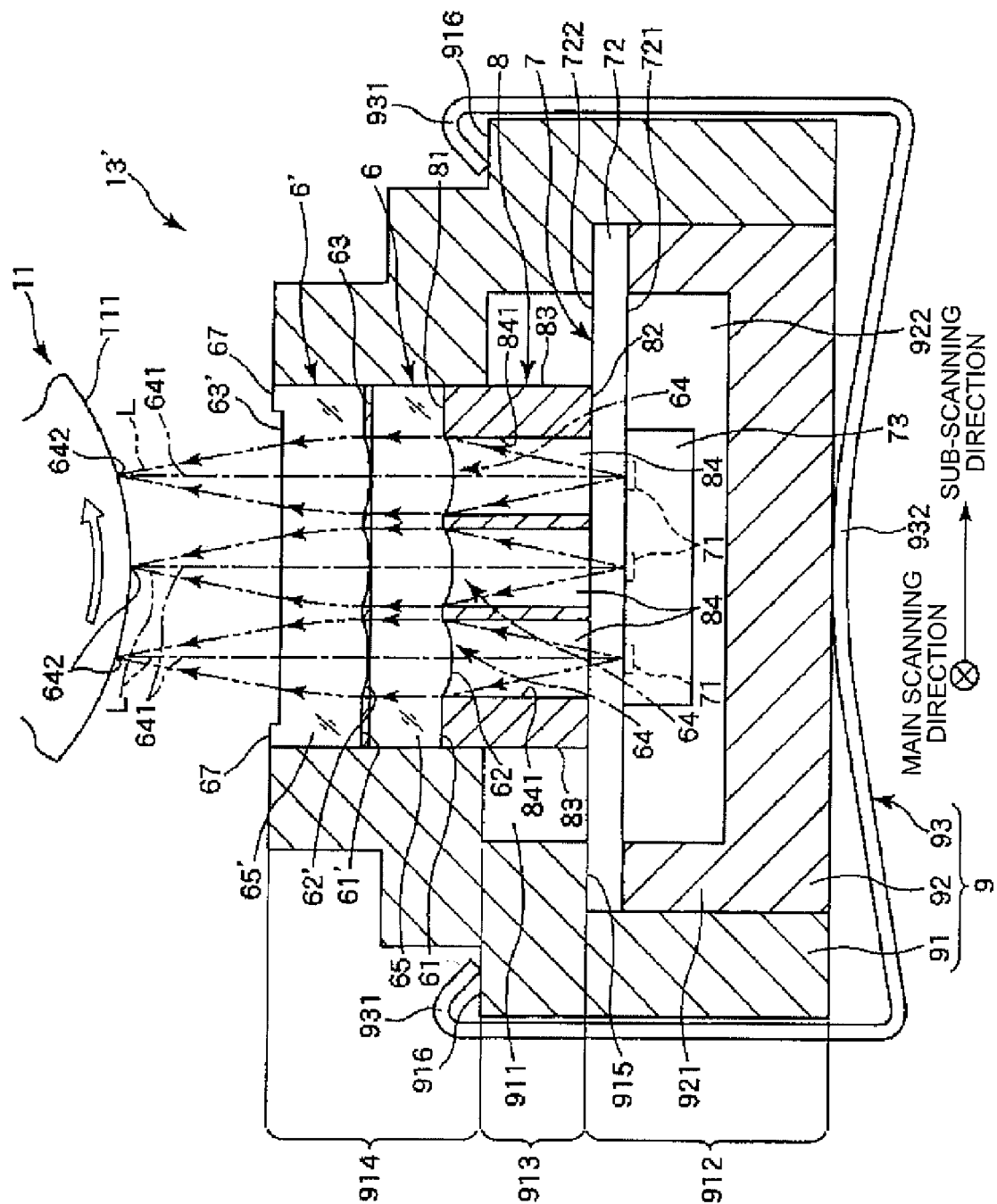
FIG. 22 is a cross-sectional view taken along the line XXII-XXII of FIG. 21.

FIG. 21 is a partially sectional perspective view illustrating the fifth embodiment of the line head included in the image forming apparatus shown in FIG. 1, and FIG. 22 is a cross-sectional view taken along the line XXII-XXII of FIG. 21. Moreover, in FIGS. 21 and 22, some of the reference numerals corresponding to the same portions as those shown in FIGS. 2 and 3 are omitted.

As shown in FIGS. 21 and 22, the line head 13' according to the present embodiment is different from that according to the first embodiment in that two ribs 67 having the same function as the two ribs 917, which function as guides for the head portion 161 of the cleaner 16 described above, are provided on the light-emitting surface (upper surface) 63' of the second lens array 6' instead of the two ribs 917 but is the same as that according to the first embodiment in other points.

In addition, the two ribs 67 are provided at the positions which do not interfere in the optical path of light transmitted through the second lens array 6' shown in FIG. 22.

In the present embodiment, a gap distance between the two ribs 67 provided in the second lens array 6' is approximately equal to the width of the head portion 161 described above.

By adopting such a configuration, each of the ribs 67 functions as a guide for the head portion 161 when the head portion 161 is made to reciprocate. Thus, since the movement of the head portion 161 in the width direction thereof is regulated, the head portion 161 is not separated from the upper surface 63' of the second lens array 6'. As a result, the entire upper surface 63' can be certainly cleaned. In addition, since an area to be cleaned is decreased, cleaning can be further easily performed and operability at the time of cleaning is improved.

Having described the line head and the image forming apparatus according to the embodiments of the invention, the invention is not limited thereto. Each of the components provided in the line head and the image forming apparatus can be replaced with a component having an arbitrary configuration capable of realizing the same function. In addition, an arbitrary structure may be added.

Furthermore, in the first and second lens arrays, a plurality of lenses is not limited to being arranged in a matrix of three rows by n columns. For example, a plurality of lenses in each of the first and second lens arrays may also be arranged in a matrix of one row by n columns, two rows by n columns, or four rows by n columns.

Furthermore, in the case of a lens pair configured to include corresponding first and second lens arrays, focal distances of at least two of lens pairs belonging to one column are different. To change the focal distance is not limited to changing the radii of curvature (shape) of convex surfaces of arbitrary lenses. For example, arbitrary lenses may be formed of materials having different refractive indexes. In the case when lenses are formed of materials having different refractive indexes, one of the lenses may be formed of an acrylic-based resin and the other lens may be formed of a polyester-based resin.

Furthermore, even though the case in which a plurality of light-emitting elements are provided corresponding to one lens (first lens or second lens) has been described in the above embodiment, the invention is not limited thereto. For example, one light-emitting element may be provided corresponding to one lens.

In addition, the number of light-emitting elements that form one light-emitting element group is not limited to eight. For example, the number of light-emitting elements that form one light-emitting element group may be two, three, four, five, six, seven, nine, or more.

Furthermore, in each light-emitting element group, light-emitting elements are not limited to being arranged in a matrix. For example, the light-emitting elements may be arranged in an arbitrary shape which is different from the matrix. For example, when one light-emitting element group is configured to include three light-emitting elements, the three light-emitting elements may be arranged such that a line, which connects the centers of the three light-emitting elements, makes a triangle.

In addition, each light-emitting element is not limited to being formed by using an organic EL element. For example, each light-emitting element may be formed by using a light-emitting diode (LED).

The entire disclosure of Japanese Patent Application Nos: 2007-69663, filed Mar. 16, 2007 and 2007-274322, filed Oct. 22, 2007 are expressly incorporated by reference herein.

What is claimed is:

1. A line head comprising:
a first lens array having a plurality of first lenses each having a convex surface as a light incidence surface;
a second lens array that is arranged at a light-emitting surface side of the first lens array so as to be opposite to the first lens array and that has a plurality of second lenses arranged at positions corresponding to the plurality of first lenses, each of the second lenses having a convex surface as a light incidence surface; and
at least a light-emitting element provided for each of the first lenses at a light incidence side of the first lens array, wherein a light-emission-side surface of the second lens array is a flat surface.

2. The line head according to claim 1, wherein the first lens array and the second lens array are arranged such that a light-emitting surface of the first lens array and a convex surface of the second lens array abut each other.

3. The line head according to claim 1, further comprising:
a first light shielding member that is provided between the first lens array and the light-emitting element and has a through holes provided at positions corresponding to each of the first lenses.

4. The line head according to claim 1, further comprising:
a second light shielding member that is provided between the first lens array and the second lens array and has through holes provided at positions corresponding to each of the first lenses and each of the second lenses.

5. The line head according to claim 1, wherein
assuming that a longitudinal direction of the first lens array is a main scanning direction and a width direction of the first lens array is a sub-scanning direction, the first lens array has the plurality of first lenses that are arranged in a plurality of columns in the main scanning direction and in a plurality of rows in the sub-scanning direction, and
assuming that a longitudinal direction of the second lens array is a main scanning direction and a width direction of the second lens array is a sub-scanning direction, the second lens array has the plurality of second lenses that are arranged in a plurality of columns in the main scanning direction and in a plurality of rows in the sub-scanning direction.

6. The line head according to claim 5, wherein a plurality of lens pairs, each of which includes each of the first lenses and each of the second lenses arranged at a position corresponding to each of the first lenses, are configured such that focal distances of at least two of the lens pairs belonging to one column are different.

7. The line head according to claim 5, wherein
the two first lenses that belong to one column and are adjacent to each other are arranged so as to deviate from each other in the main scanning direction, and
the two second lenses that belong to one column and are adjacent to each other are arranged so as to deviate from each other in the main scanning direction.

8. The line head according to claim 5, wherein the light-emitting elements corresponding to the plurality of first lenses belonging to one column emit light at different timing.

9. The line head according to claim 1, wherein the light-emitting element is provided in a plural number for each of the first lenses.

10. The line head according to claim 9, wherein assuming that a longitudinal direction of the first lens array is a main scanning direction and a width direction of the first lens array is a sub-scanning direction, the plurality of light-emitting elements provided for each of the first lenses are arranged in a plurality of columns in the main scanning direction and in a plurality of rows in the sub-scanning direction.

11. The line head according to claim 10, wherein the plurality of light-emitting elements provided for each of the first lenses are arranged such that two of the plurality of light-emitting elements, which belong to one column and are adjacent to each other, deviate from each other in the main scanning direction.

12. The line head according to claim 10, wherein in the plurality of light-emitting elements provided for each of the first lenses, the light-emitting element belonging to one row and the light-emitting element belonging to another row different from the one row emit light at different timing.

13. The line head according to claim 1, wherein
the line head is arranged opposite a light receiving surface of a photoconductor that receives light emitted from the second lens array, and
the line head further includes a positioning unit that regulates a distance between the light receiving surface and the second lens array.

14. An image forming apparatus comprising:
a photosensitive drum having a light receiving surface that receives light; and
a line head arranged opposite the light receiving surface, wherein the line head includes:
a first lens array having a plurality of first lenses each having a convex surface as a light incidence surface;
a second lens array that is arranged at a light-emitting surface side of the first lens array so as to be opposite to the first lens array and that has a plurality of second lenses arranged at positions corresponding to the plurality of first lenses, each of the second lenses having a convex surface as a light incidence surface; and
at least a light-emitting element provided for each of the first lenses at a light incidence side of the first lens array,
wherein a light-emission-side surface of the second lens array is a flat surface.

15. The image forming apparatus according to claim 14, further comprising:
a cleaning unit that cleans the light-emission-side surface of the second lens array.

* * * * *